(12) United States Patent
Iwatsuki et al.

(10) Patent No.: US 9,001,954 B2
(45) Date of Patent: Apr. 7, 2015

(54) RECEPTION CIRCUIT, INFORMATION PROCESSING DEVICE, AND BUFFER CONTROL METHOD

(75) Inventors: Ryuji Iwatsuki, Kawasaki (JP); Kazumi Hayasaka, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 160 days.

(21) Appl. No.: 13/009,661

(22) Filed: Jan. 19, 2011

(65) Prior Publication Data

US 2011/0182384 A1    Jul. 28, 2011

(30) Foreign Application Priority Data

Jan. 22, 2010 (JP) ................................. 2010-012341

(51) Int. Cl.
- H04L 25/00 (2006.01)
- H04L 7/08 (2006.01)
- H04L 25/14 (2006.01)

(52) U.S. Cl.
CPC . *H04L 7/08* (2013.01); *H04L 25/14* (2013.01)

(58) Field of Classification Search
USPC .................................................. 375/372, 146
See application file for complete search history.

(56) References Cited

U.S. PATENT DOCUMENTS

| | | | |
|---|---|---|---|
| 7,093,061 B2 | 8/2006 | Teo | |
| 7,193,429 B2 | 3/2007 | Okuyama | |
| 7,454,537 B1 | 11/2008 | Xue | |
| 7,500,131 B2 * | 3/2009 | Panikkar et al. | 713/503 |
| 7,570,659 B2 * | 8/2009 | Susnow et al. | 370/465 |
| 2002/0112099 A1 * | 8/2002 | Collier | 710/1 |
| 2006/0273941 A1 * | 12/2006 | Charath et al. | 341/100 |
| 2007/0177701 A1 * | 8/2007 | Thanigasalam | 375/372 |
| 2009/0063889 A1 * | 3/2009 | Dada et al. | 713/503 |
| 2009/0247068 A1 * | 10/2009 | Toyoda | 455/8 |
| 2010/0284486 A1 * | 11/2010 | Kuwata | 375/295 |

FOREIGN PATENT DOCUMENTS

| | | |
|---|---|---|
| JP | 2005-159578 A | 6/2005 |
| JP | 2008-67278 A | 3/2008 |
| JP | 2008-172657 A | 7/2008 |

OTHER PUBLICATIONS

"Extended European Search Report" mailed by EPO and corresponding to European application No. 11150819.8 on Jul. 11, 2011.

(Continued)

*Primary Examiner* — Eva Puente
(74) *Attorney, Agent, or Firm* — Fujitsu Patent Center

(57) ABSTRACT

A reception circuit that receives data in serial communications through a plurality of lanes includes a plurality of buffers provided for each of the plurality of lanes that each stores data received through corresponding lane, a multilane control circuit that detects the skew between the lanes, and outputs an adjustment instruction for adjusting a read address of a buffer and a deskew information indicating that a skew adjustment between which buffer the lanes is to be performed based on the detected skew, and a plurality of address control circuits provided for each of the plurality of lanes that each transmits the adjustment instruction to a corresponding buffer when receiving the deskew information, wherein the buffer that has received the adjustment instruction adjusting its read address.

5 Claims, 21 Drawing Sheets

(56) References Cited

OTHER PUBLICATIONS

Japanese Office Action mailed Sep. 3, 2013 for corresponding Japanese Application No. 2010-012341, with Partial English-language Translation.

European Office Action mailed on Jan. 5, 2015 for corresponding European Patent Application No. 11150819.8, 7 pages.

* cited by examiner

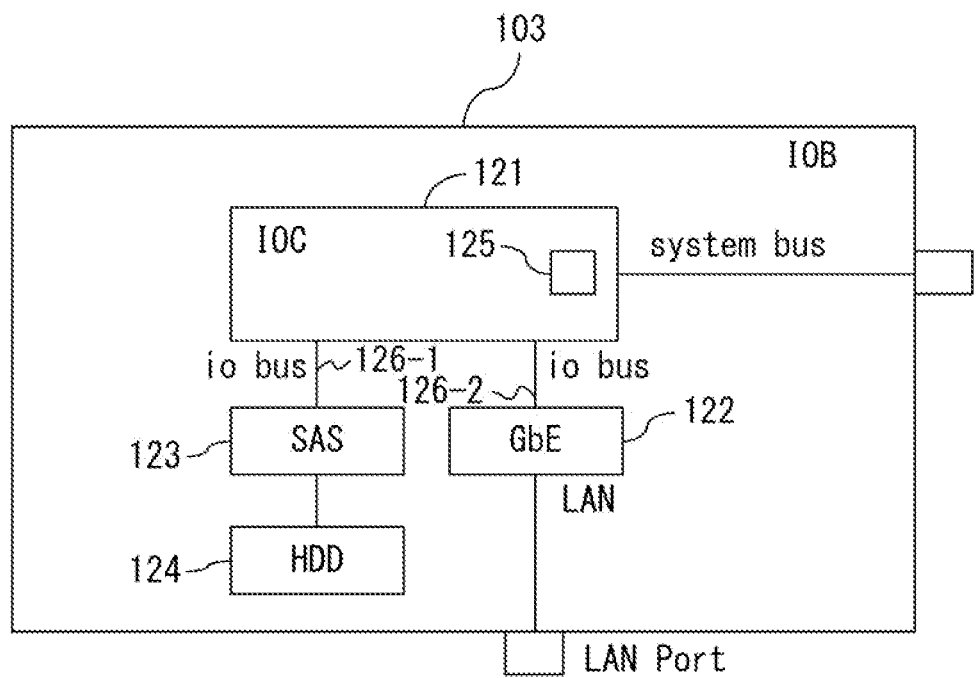
F I G. 4

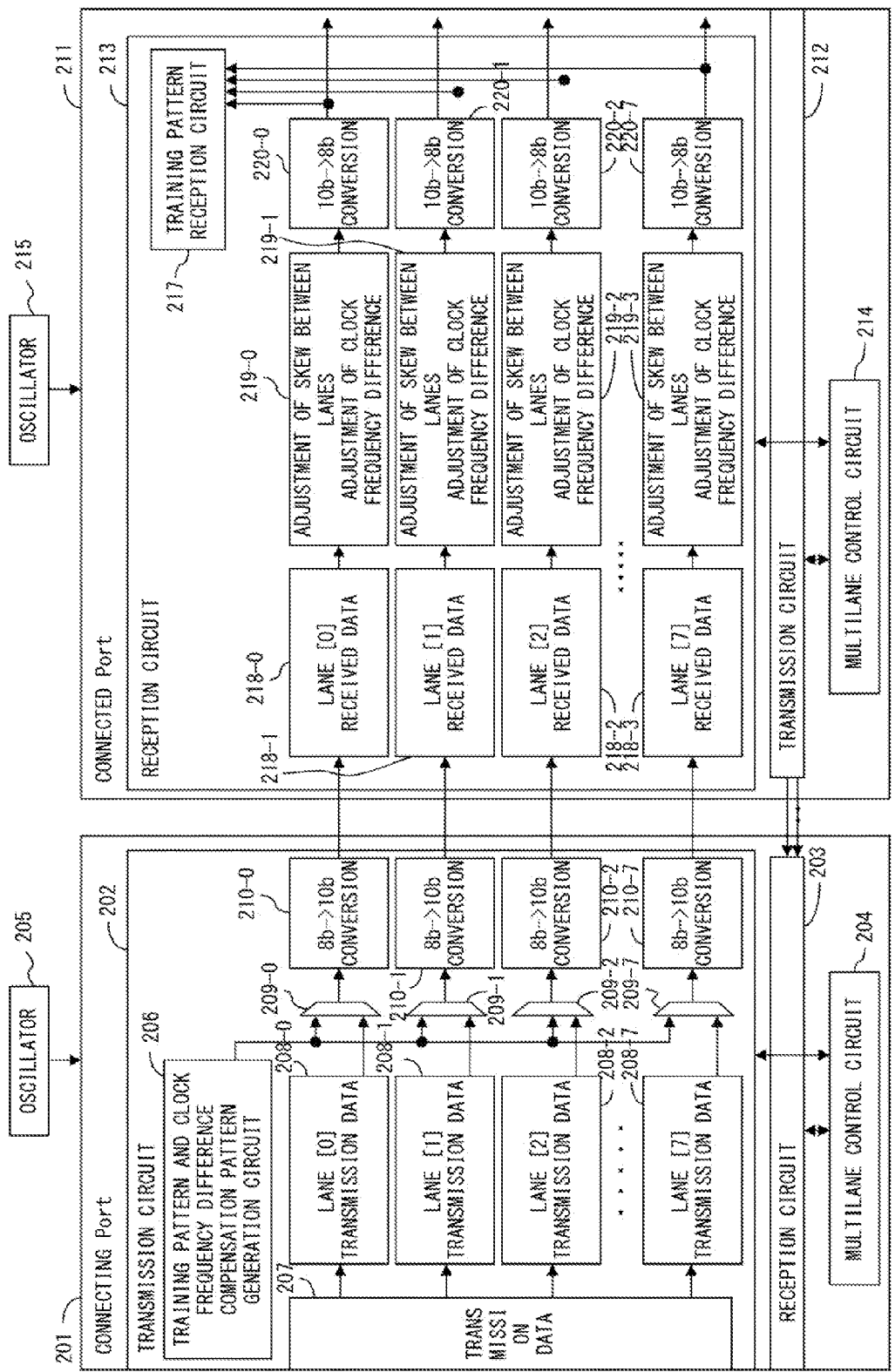
F I G. 7

TRAINING PATTERN

| TH | ... | AL | ... | DS | ... | SI | ... |

F I G. 8

CLOCK FREQUENCY DIFFERENCE COMPENSATION PATTERN

| CH | DM | DM | DM | DM | DM | DM |

F I G. 9

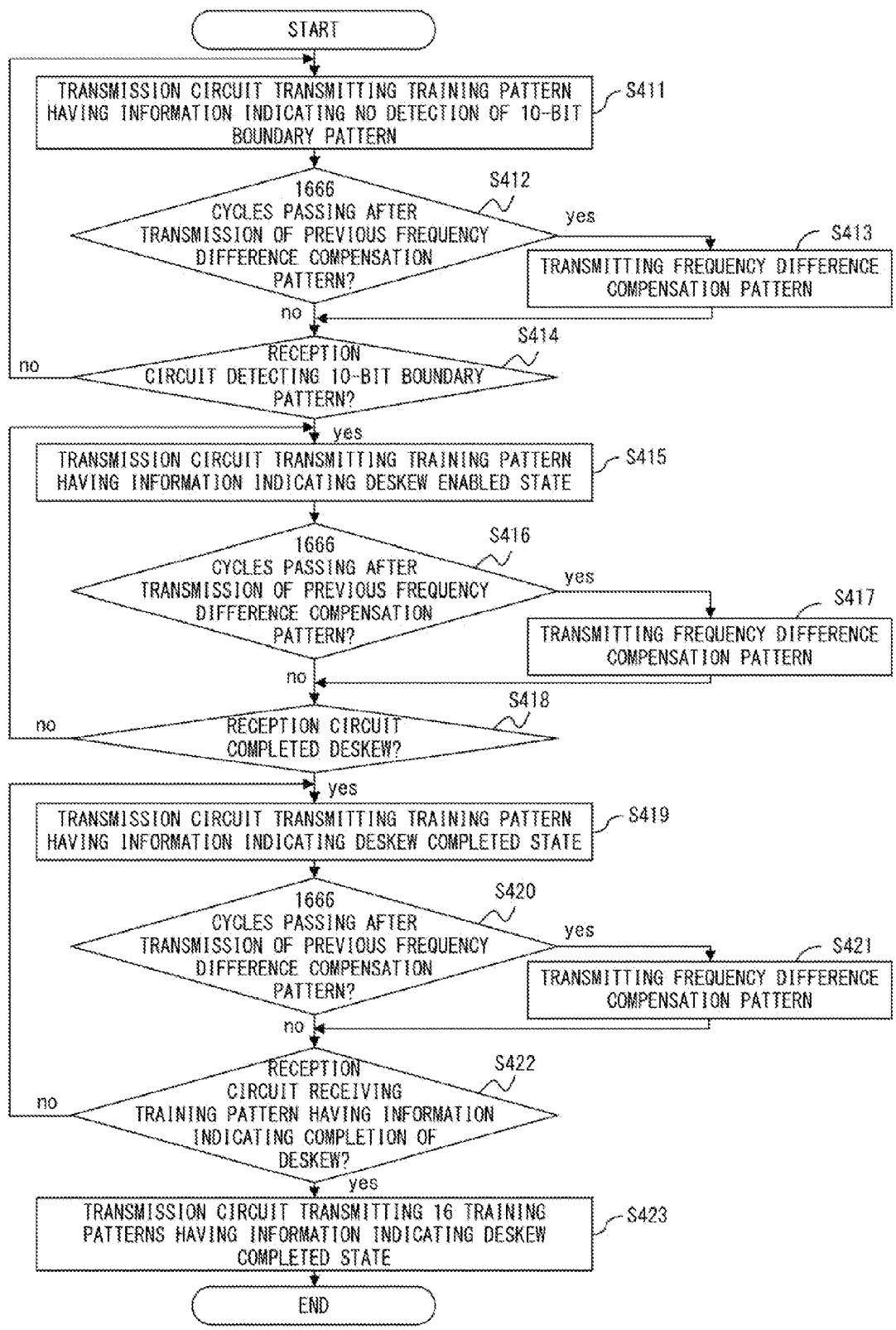
F I G. 1 2

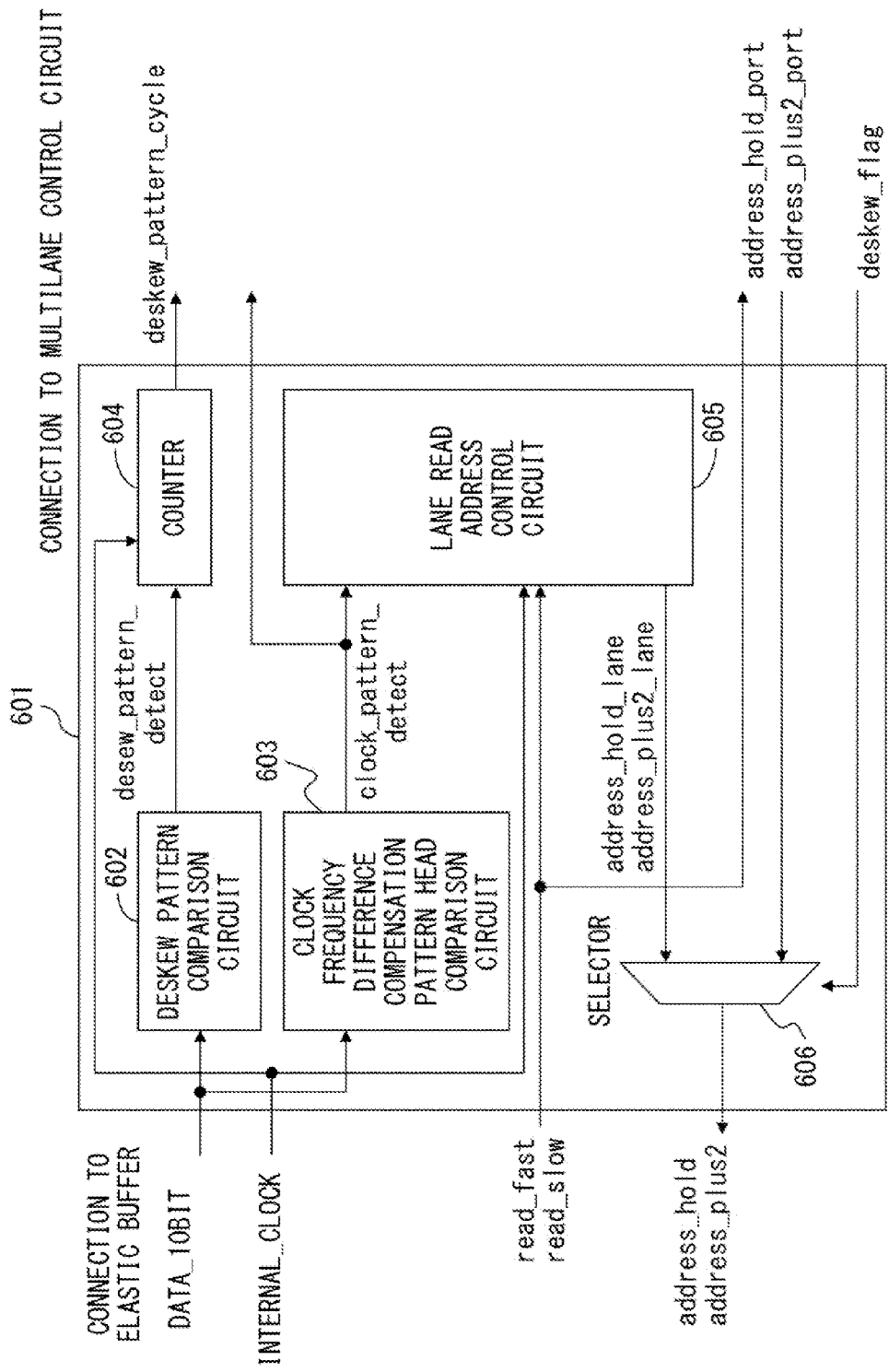
F I G. 14

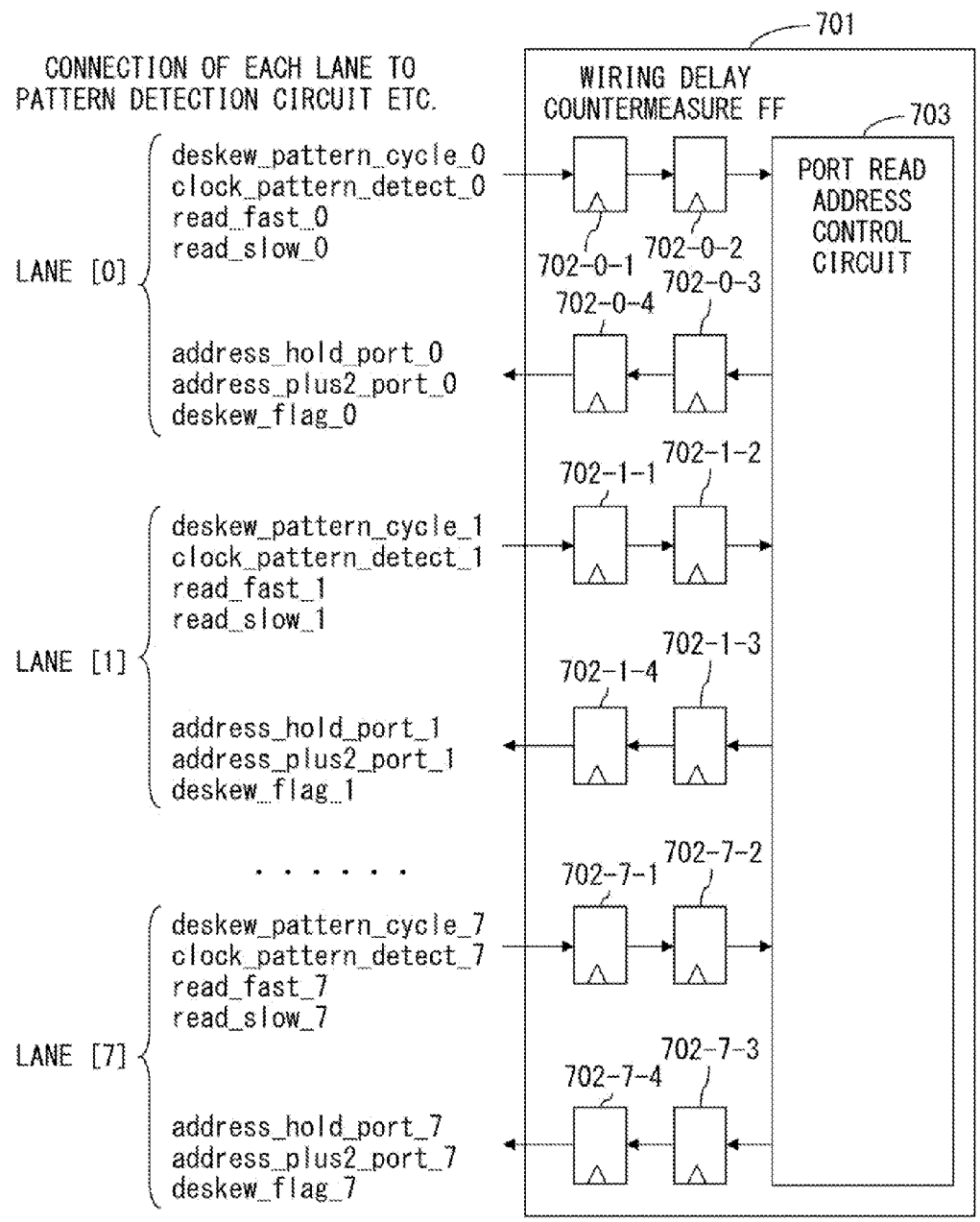
F I G. 16

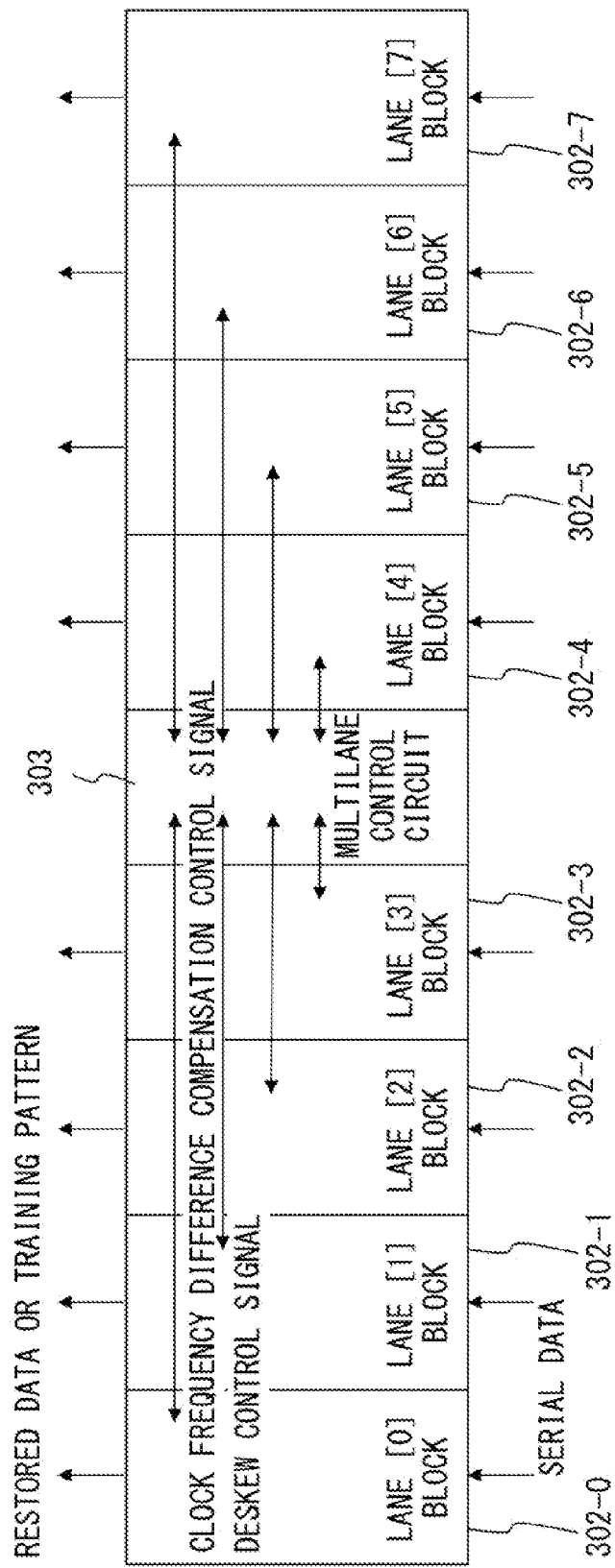
F I G. 17

RECEPTION CIRCUIT, INFORMATION PROCESSING DEVICE, AND BUFFER CONTROL METHOD

CROSS-REFERENCE TO RELATED APPLICATIONS

This application is based on and claims the benefit of priority of the prior Japanese Patent Application No. 2010-012341, filed on Jan. 22, 2010, the entire contents of which are incorporated herein by reference.

FIELD

The embodiments discussed herein are related to a reception circuit, an information processing device and a buffer control method.

BACKGROUND

When serial communications are performed using a plurality of lanes between ports, a transmission circuit as a connecting port divides transmission data into the number of lanes, and transmits the divided data through each lane. The reception circuit as a connected port restores the data received through each lane.

FIG. 1 is a configuration of a conventional reception circuit.

A reception circuit 11 includes a lane block 21-m (m=0 through 7)) and a deskew processing unit 31.

In this specification, it is assumed that the number of lanes is eight and the lane m is connected to a lane block 21-m.

A lane block 21-0 includes a DESerializer 41, a Gear-Box 42, a 10 bit boundary detection circuit 43, an elastic buffer 44, a clock frequency difference compensation pattern detection circuit 45, and an 8B10B conversion circuit 46.

Lane blocks 21-1 through 21-7 have the same configurations as the lane block 21-0.

The DESerializer 41 converts received 1-bit width serial data into 4-bit width parallel data (DATA_4BIT 51). In addition, it performs a clock recovery from the received serial data, and generates a reception clock (RX_CLOCK_DIVIDE_4, and RX_CLOCK_DIVIDE_10).

The RX_CLOCK_DIVIDE_4 is a ¼ frequency clock with respect to the serial data transfer speed, and the RX_CLOCK_DIVIDE_10 is a 1/10 frequency clock. For example, when the serial data transfer speed is 2.5 GT/s, RX_CLOCK_DIVIDE_4 is 625 MHz, and RX_CLOCK_DIVIDE_10 is 250 MHz.

The serial data transfer is performed using generally known 8B10B conversion data. In the 8B10B conversion, the transmission circuit converts 8-bit data (8b-code) into 10-bit data (10b-code) and transmits the converted data. The reception circuit restores 10b-code to 8b-code. The 10b-code is referred to as a symbol.

The Gear-Box 42 is a FIFO buffer in which 4-bit width DATA_4BIT 51 is written using an RX_CLOCK_DIVIDE_4 clock, and 10-bit width DATA_10BIT_UNALIGNMENT 52 is read using an RX_CLOCK_DIVIDE_10 clock.

The 10 bit boundary detection circuit 43 detects a boundary pattern, adjusts the DATA_10BIT_UNALIGNMENT 52 into 10-bit boundary data (DATA_10BIT_ALIGNMENT 53) in a 10b-code unit, and outputs the DATA_10BIT_ALIGNMENT 53 to the elastic buffer 44. The 10-bit boundary pattern is included in a training pattern to be transferred during the initialization of the serial bus.

A training pattern is configured by a plurality of symbols, and a transmission circuit transmits the training pattern through each lane with the same timing.

The elastic buffer 44 is a FIFO buffer for absorbing the clock frequency difference between connection devices. A write address is incremented by one in every cycle. A read address is normally incremented by one in every cycle, but is held, or incremented by one or two according to the signal from the clock frequency difference compensation pattern detection circuit 45 when a clock frequency difference compensation pattern is detected.

A clock frequency difference compensation pattern is configured by a plurality of symbols, and transmitted through each lane with the same timing during the initialization of the serial bus and in the normal operation.

The clock frequency difference compensation pattern detection circuit 45 outputs a signal for adjustment of the read address of the elastic buffer 44.

A clock frequency difference compensation pattern is periodically transmitted through a serial bus for compensation of the clock frequency difference between connection devices. For example, when a clock frequency tolerance between connection devices is within ±300 ppm, the transmission circuit transmits one clock frequency difference compensation pattern within 1666 cycles.

The 8B10B conversion circuit 46 converts a 10b-code (DATA_10BIT 54) into a 8b-code (DATA_8BIT 55).

The deskew processing unit 31 includes a deskew buffer 51-m (m=0 through 7) and a deskew pattern detection circuit 52.

A deskew buffer 51 is a FIFO buffer, and outputs restored data with the skew among the lanes adjusted based on the deskew pattern detection position.

However, it is not a simple FIFO buffer, but changes a read address when adjusting the deskew positions.

The deskew pattern detection circuit 52 detects the position of the deskew pattern from the data output from each lane, and outputs to the deskew buffer 51a signal for control of the read address to adjust the skew among the lanes.

A deskew pattern is included in the training pattern transferred during the initialization of the serial bus.

After the adjustment of the deskew position at the initialization of the serial bus, the deskew position is readjusted each time a clock frequency difference compensation pattern is periodically received. To allow the elastic buffer 44 of each lane to independently compensate for the clock frequency difference, the deskew processing unit 31 receives a clock frequency difference compensation information 56 from each lane and readjusts the deskew position.

Conventionally, a serial bus for a plurality of lanes has been used as a bus not largely affecting the performance by the latency of an IO bus etc.

When a serial bus for a plurality of lanes is adopted for a system bus of an information processing device of a large server etc., the latency of the reception circuit of the LSI loaded into the server largely affects the performance of the entire server.

However, the conventional reception circuit has the problem of latency because of two FIFO buffers (elastic buffer and deskew buffer) for the respective functions.

[Patent Document 1] Japanese Laid-open Patent Publication No. 2005-159578

[Patent Document 2] Japanese Laid-open Patent Publication No. 2008-172657

SUMMARY

According to an aspect of the invention, a reception circuit that receives data in serial communications through a plurality of lanes includes a plurality of buffers provided for each of the plurality of lanes that each stores data received through corresponding lane, a multilane control circuit that detects the skew between the lanes, and outputs an adjustment instruction for adjusting a read address of a buffer and a deskew information indicating that a skew adjustment between which buffer the lanes is to be performed based on the detected skew, and a plurality of address control circuits provided for each of the plurality of lanes that each transmits the adjustment instruction to a corresponding buffer when receiving the deskew information, wherein the buffer that has received the adjustment instruction adjusting its read address.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 4 is a configuration of the IOB according to an embodiment of the present invention;

FIG. 7 illustrates the data transmitting and receiving system according to an embodiment of the present invention;

FIG. 8 is a format of a training pattern;

FIG. 9 is a format of a clock frequency difference compensation pattern;

FIG. 12 is a flowchart of an operation during the initialization of the serial bus of a transmission circuit;

FIG. 14 is a configuration of the pattern detection circuit according to an embodiment of the present invention;

FIG. 16 is a configuration of the multilane control circuit according to an embodiment of the present invention;

FIG. 17 illustrates the arrangement of the wiring of the reception circuit according to an embodiment of the present invention;

DESCRIPTION OF EMBODIMENTS

The embodiments of the present invention are described below with reference to the attached drawings.

Figure 2:
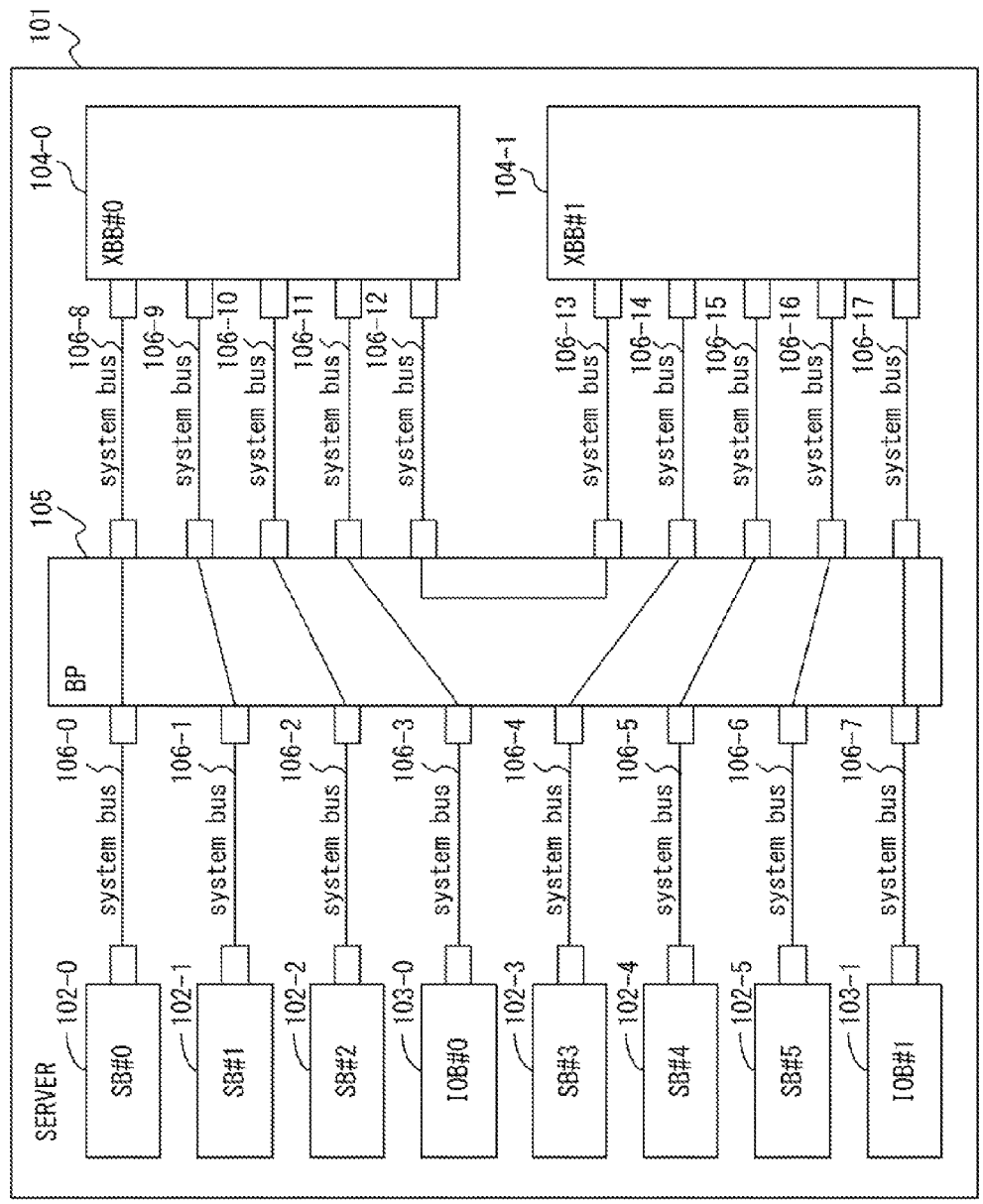
FIG. 2 is a configuration of a server according to an embodiment of the present invention.

FIG. 2 is a configuration of a server according to an embodiment of the present invention.

A server 101 includes a system board (SB) 102-$i$ ($i$=0 through 5), an IO board (IOB) 103-$j$ ($j$=0 through 1), a cross bar board (XBB) 104-$k$ ($k$=0 through 1), and a back plane board (BP) 105.

An SB 102 is a substrate provided with a central processing unit (CPU), DRAM (dynamic random access memory), etc. and performing various processes.

An IOB 103 is a substrate provided with a connector for connection to a local area network (LAN), a hard disk device (HDD), etc.

An XBB 104 is a substrate provided with a crossbar switch for mutual connection to the SB 102 and the IOB 103.

The BP 105 is a substrate for mutual connection of the SB 102, the IOB 103, and the XBB 104 through a connector.

A system bus 106-$r$ ($r$=0 through 17) makes a connection between an SB and XBB, an IOB and an XBB, and an XBB and an XBB θ via the BP 105. The system bus 106 is a multilane serial bus.

When the CPU on the SB 102 accesses the DRAM of another SB, a packet is transmitted through the XBB 104 using the system bus 106. Similarly, when a gigabit Ethernet (GbE) controller on the IOB 103 accesses the DRAM on the SB 102, a packet is transmitted through the XBB 104 using the system bus 106.

For example, when an SB 102-0 accesses an SB 102-1, a packet is transmitted from the SB 102-0 to the SB 102-1 through an XBB 104-0.

When the SB 102-0 accesses an SB 102-4, a packet is transmitted from the SB 102-0 to the SB 102-4 through the XBB 104-0 and the XBB 104-1.

In the transmission and the reception of a packet, the access latency increases in the transmission through the XBB 104. Therefore, lower packet passage latency is requested for a crossbar switch (XB) etc. loaded into the XBB 104.

Figure 3:
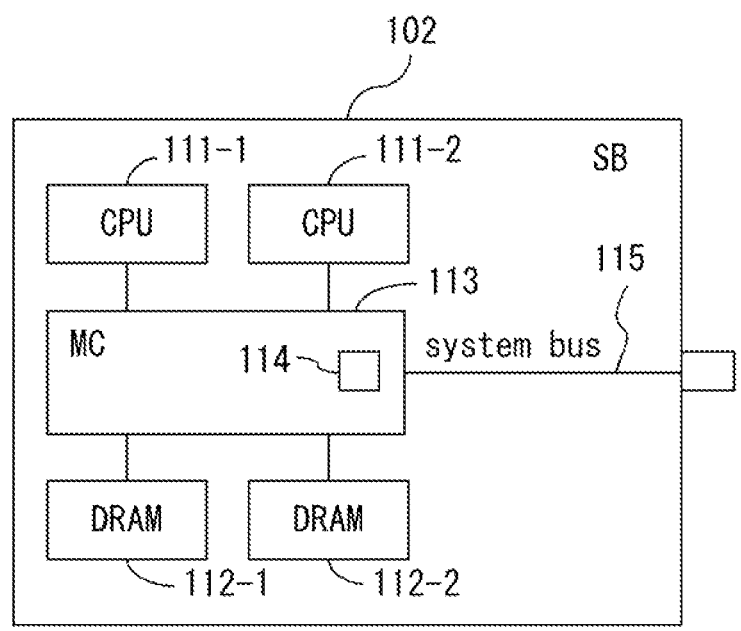
FIG. 3 is a configuration of the SB according to an embodiment of the present invention.

FIG. 3 is a configuration of the SB according to an embodiment of the present invention.

The SB 102 includes a CPU 111-$n$ ($n$=1 through 2), DRAM 112-$n$, and a memory controller (MC) 113.

A CPU 111 is a central processing unit, and performs various processes on the SB 102.

The MC 113 reads and writes the data of DRAM 112, and performs refreshing control etc. The MC 113 is connected to the XBB 104 by the system bus 115 through the BP 105.

The MC 113 includes a port unit 114 having a transmission circuit and a reception circuit.

A transmission circuit transmits data to the system bus 115, and a reception circuit receives the data from the system bus 115.

The reception circuit can be a reception circuit according to the embodiment of the present invention described later.

The MC 113 controls access to DRAM 112 in the SB 102, the DRAM 112 in another SB 102, a GbE controller in the IOB 103, or a serial attachment SCSI controller, according to a packet transmitted from the CPU 111.

FIG. 4 is a configuration of the IOB according to an embodiment of the present invention.

The IOB 103 includes an IOC 121, a GbE controller 122, a serial attachment SCSI (SAS) controller 123, and an HDD 124.

The IOC 121 is an IO controller. The IOC 121 is connected to the GbE controller 122 and the SAS controller 123 respectively through the IO buses 126-1 and 126-2.

The IOC 121 is connected by a system bus to the XBB 104 through the BP 105.

The IOC 121 includes a port unit 125 having a transmission circuit and a reception circuit.

The transmission circuit transmits data to a system bus, and the reception circuit receives the data from the system bus.

The reception circuit can be a reception circuit according to the embodiment of the present invention described later.

The GbE controller 122 performs communications through the GbE, and has a LAN port.

The SAS controller 123 performs serial communications and is connected to the HDD 124.

Figure 5:
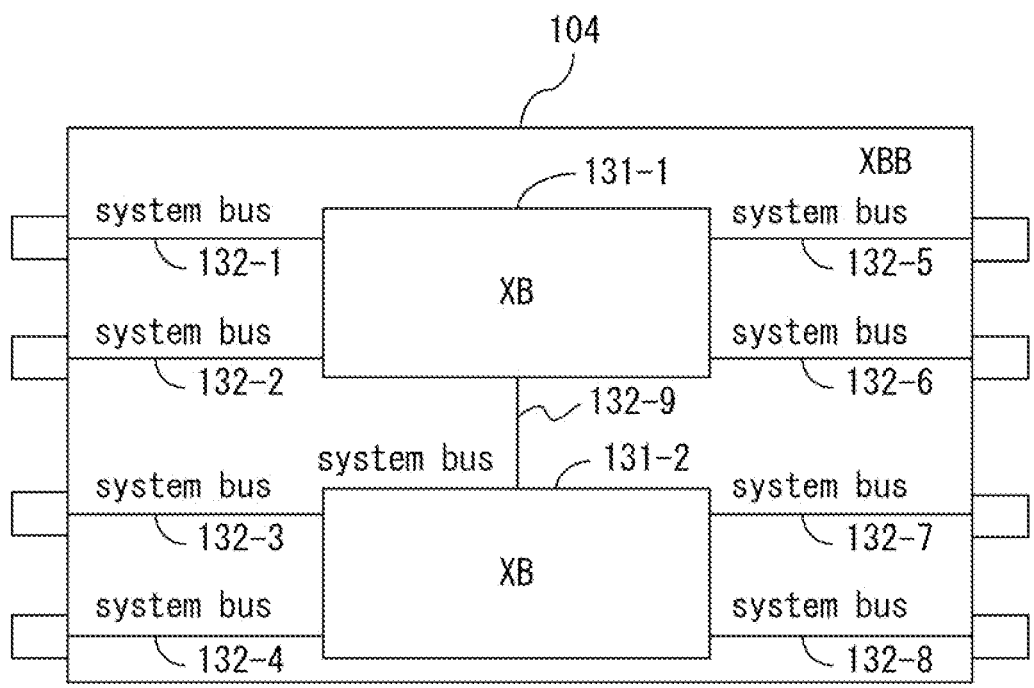
FIG. 5 is a configuration of the XBB according to an embodiment of the present invention.

FIG. 5 is a configuration of the XBB according to an embodiment of the present invention.

The XBB 104 includes a plurality of XBs 131-$p$ (p=1 through 2).

An XB 131 is a crossbar switch for dynamically selecting a route of data. The XB 131 is connected to other XBB 104, the SB 102, or the IOB 103 through the system bus 132-$s$ (s=1 through 8). In addition, the XB 131-1 is connected to the XB 131-2 through the system bus 132-9.

The XB 131 receives a packet transfer from the SB 102 etc., recognizes the destination included in the header of the packet, and performs routing to a destination.

Figure 6:
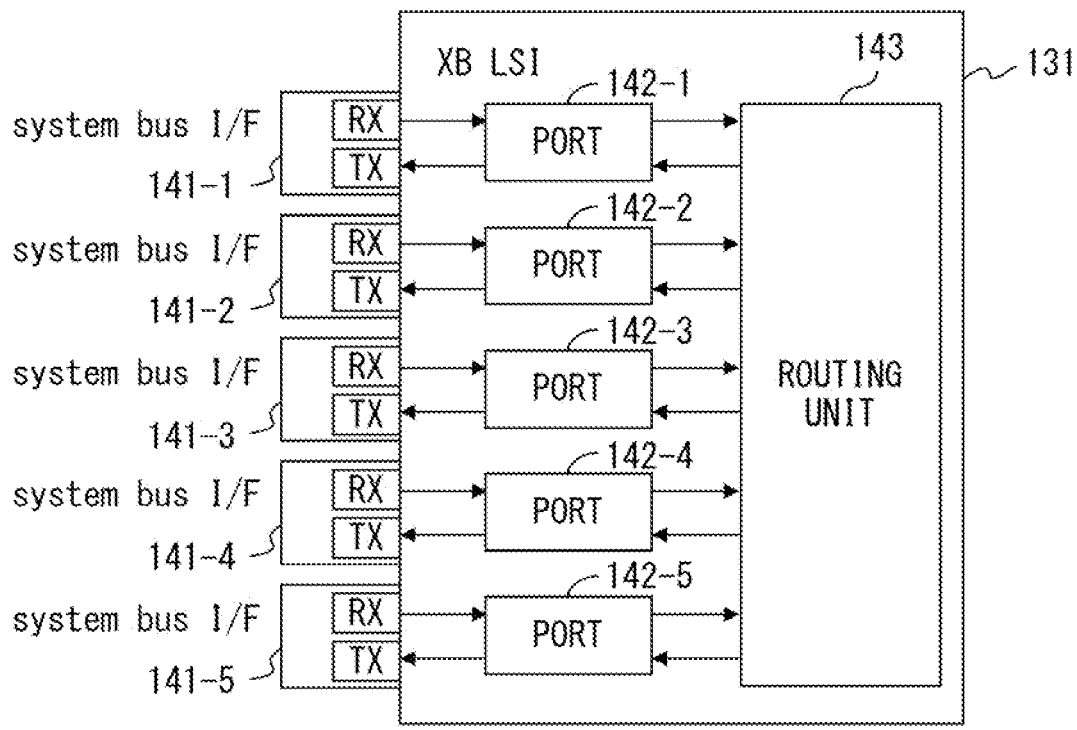
FIG. 6 is a configuration of the XB according to an embodiment of the present invention.

FIG. 6 is a configuration of the XB according to an embodiment of the present invention.

The XB 131 is the LSI (large scale integration) loaded into the XBB 104.

The XB 131 includes a system bus I/F 141-$p$ (p=1 through 5), a port unit 142-$p$, and a routing unit 143.

A system bus I/F 141 is an interface for connection to the serial bus of a multilane, and includes an transmission I/F (TX) and a reception I/F (RX).

A port unit 142 controls the protocol of a system bus.

A port unit 142 includes a transmission circuit and a reception circuit.

A transmission circuit transmits data to a system bus, and a reception circuit receives the data from the system bus.

The reception circuit can be a reception circuit according to an embodiment of the present invention described later.

The routing unit 143 outputs to the port unit 142$a$ packet corresponding to the destination of the packet input from the port unit 142.

FIG. 7 illustrates the data transmitting and receiving system according to an embodiment of the present invention.

Described in this specification is a case in which data is transmitted from a transmission circuit of a connecting device to a reception circuit of a connected device.

For example, in FIG. 2, when data is transmitted from the SB 102-0 to the XBB 104-0, the connecting device corresponds to the SB 102-0, and the connected device corresponds to the XBB 104-0.

A port unit of the connecting device (hereinafter referred to as a connecting port) 201 includes a transmission circuit 202, a reception circuit 203, and a multilane control circuit 204.

A port unit of the connected device (hereinafter referred to as a connected port) 211 includes a transmission circuit 212, a reception circuit 213, and a multilane control circuit 214.

The transmission circuit 202 of the connecting port 201 is connected to the reception circuit 213 of the connected port 211 by the serial bus of a plurality of lanes (eight lanes 0 through 7 in this example).

The transmission circuit 202 includes a training pattern and clock frequency difference compensation pattern generation circuit 206, a transmission data division unit 207, a lane m transmission data transmission unit 208-$m$ (m=0 through 7), a selector 209-$m$, and an 8B10B conversion unit 210-$m$.

The reception circuit 213 includes a training pattern reception circuit 217, a lane m received data processing unit 218-$m$, an adjustment unit 219-$m$, and an 8B10B conversion unit 220-$m$.

After the completion of the initialization of the serial bus, the transmission data division unit 207 divides the data into data to be transmitted through each of the eight lanes.

The lane m transmission data transmission unit 208-$m$ outputs to the divided transmission data to the selector 209-$m$.

A selector 209 selects and outputs any of the transmission data, a training pattern, and a clock frequency difference compensation pattern.

The 8B10B conversion unit 210-$m$ converts the transmission data from an 8b-code to a 10b-code, and outputs a result to the serial bus.

The reception circuit 213 includes the lane m received data processing unit 218-$m$, the adjustment unit 219-$m$, the 8B10B conversion unit 220-$m$, and the training pattern reception circuit 217.

The lane m received data processing unit 218-$m$ generates a reception clock from received data by a clock recovery, and adjusts the data into 10b-code data unit.

The adjustment unit 219-$m$ adjusts the skew between lanes and a clock frequency difference.

The 8B10B conversion unit 220-$m$ converts a 10b-code received in each lane into an 8b-code, and restored received data. To correctly restore data, it is necessary to perform a lane skew adjustment and a clock frequency difference compensation.

During the initialization of the serial bus, not data but a training pattern is transmitted and received. A receiving side performs a deskew process etc. by receiving a training pattern.

The multilane control circuit 204 issues an instruction to transmit and receive a training pattern to the transmission circuit 202 and the reception circuit 203.

The multilane control circuit 214 issues an instruction to transmit and receive a training pattern to the transmission circuit 212 and the reception circuit 213.

The multilane control circuits 204 and 214 issue an instruction to transmit and receive data after the completion of the initialization.

A training pattern and a frequency difference compensation pattern are generated by the training pattern and clock frequency difference compensation pattern generation circuit 206 of the transmission circuit 202.

The training pattern is input to the training pattern reception circuit 217 of the reception circuit 213.

The connecting port 201 and the connected port 211 are provided with a reference clock respectively from the oscillators 205 and 215. Depending on the individual difference of an oscillator, each reference clock frequency is slightly different.

The training pattern and clock frequency difference compensation pattern generation circuit 206 periodically transmits a clock frequency difference compensation pattern for clock frequency difference compensation of the connecting port 201 and the connected port 211 regardless of during the initialization of the serial bus or after the completion of the initialization. For example, when the reference clock frequency tolerance between connection devices is within ±300 ppm, a clock frequency difference compensation pattern is transmitted once within 1666 cycles.

Figure 8:
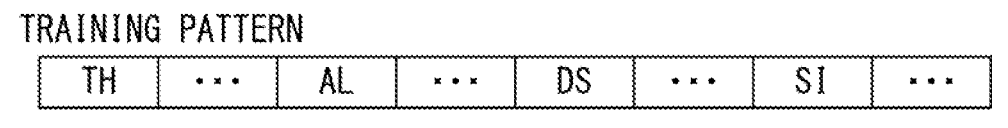

FIG. 8 is a format of a training pattern.

The training pattern according to an embodiment is configured by 32 symbols. The types of the symbols can be TH, AL, DS, and SI. One symbol is configured by 10 bits.

TH refers to a training pattern head, and is a symbol indicating the head of a training pattern.

AL refers to alignment, and is a symbol indicating a 10-bit boundary pattern.

DS refers to deskew, and is a symbol indicating a deskew pattern.

SI refers to sequence information, and is a symbol indicating the information about a notification to a connected port in the initializing procedure.

One symbol can have the functions of TH, AL and DS.

FIG. 9 is a format of a clock frequency difference compensation pattern.

The clock frequency difference compensation pattern according to an embodiment is configured by seven symbols. The types of the symbols can be CH and DM.

CH refers to a clock head, and is a symbol indicating the head of a clock frequency difference compensation pattern.

DM refers to dummy, and is a symbol to be added or deleted in the clock frequency difference compensating operation. The DM is added or deleted in the control of the read address of an elastic buffer.

The lengths of a training pattern and a clock frequency difference compensation pattern are not limited to the above-mentioned lengths. The lengths of the training pattern and the clock frequency difference compensation pattern depend on the operation frequency, the arranged wiring, and the serial bus protocol of a reception circuit, and can be appropriately changed.

Figure 10:
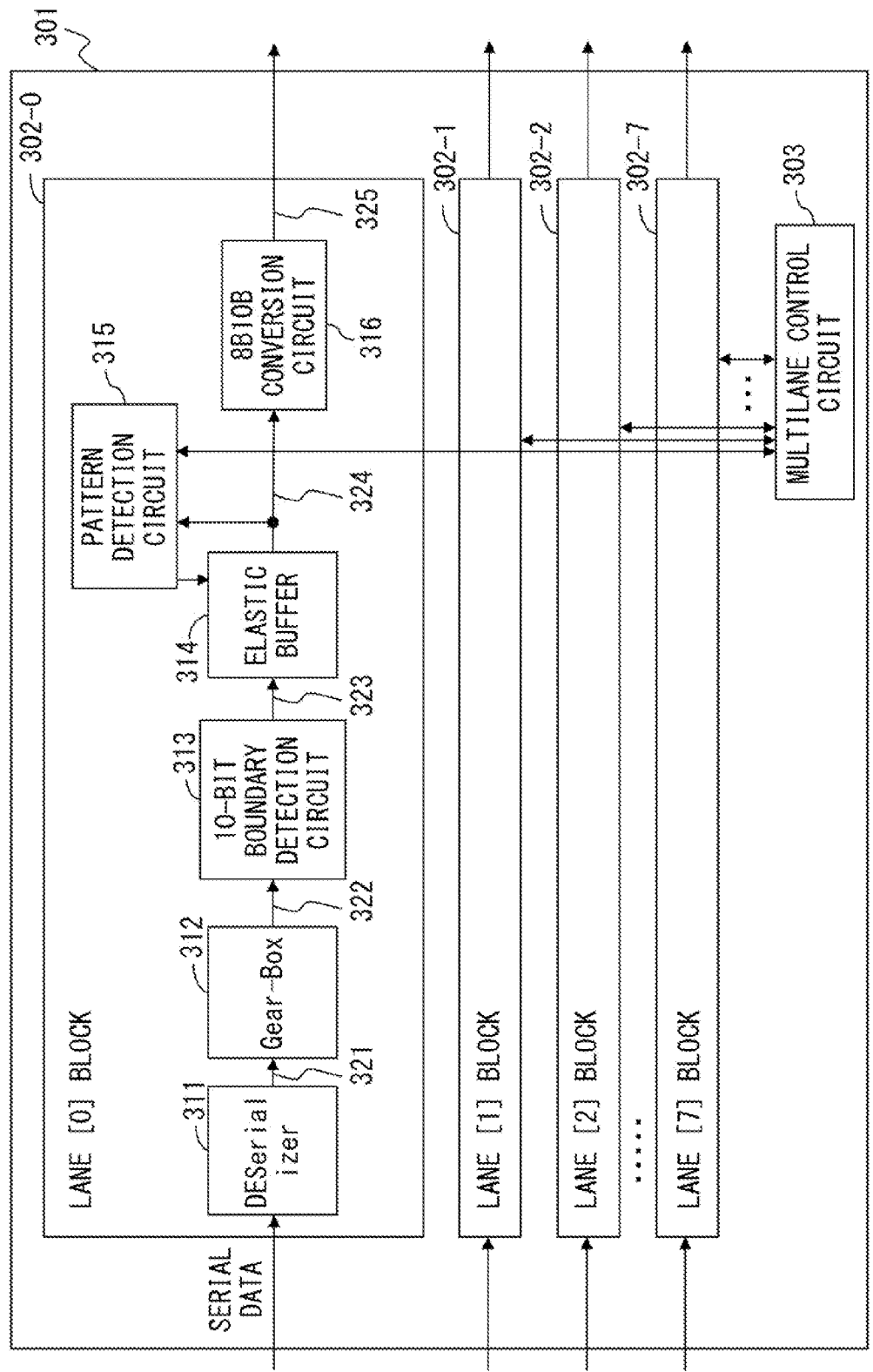
FIG. 10 is a configuration of a reception circuit according to an embodiment of the present invention.

FIG. 10 is a configuration of a reception circuit according to an embodiment of the present invention.

A reception circuit 301 includes a lane block 302-*m* (m=0 through 7) and a multilane control circuit 303.

The reception circuit 301 corresponds to the reception circuits 203 and 213 in FIG. 7.

In the embodiment of the present invention, the number of lanes is eight, that is, the lanes 0 through 7. The data is divided by the transmission circuit, and transmitted via the lanes 0 through 7.

In the following descriptions and the attached drawings, the lane block 302-*m* connected to the lane m (m=0 through 7) can be described as a lane m block.

The lane m block processes the data which passes through the lane m.

In FIG. 10, the detailed configuration of only the lane 0 block is illustrated. The configurations of the lane 1 block through lane 7 block are the same as the configuration of the lane 0 block.

A lane 0 block 302-0 includes a DESerializer 311, a gear-box 312, a 10-bit boundary detection circuit 313, an elastic buffer 314, a pattern detection circuit 315, and an 8B10B conversion circuit 316.

The DESerializer 311 converts the received 1-bit width serial data into 4-bit width parallel data (DATA_4BIT 321). The DESerializer 311 generates a reception clock (RX_CLOCK_DIVIDE_4, and RX_CLOCK_DIVIDE_10) from the received serial data by the clock recovery.

The RX_CLOCK_DIVIDE_4 is a ¼ frequency clock with respect to the serial data transfer speed. The RX_CLOCK_DIVIDE_10 is a 1/10 frequency clock with respect to the serial data transfer speed.

That is, it indicates the multiplication of the reference clock frequency of the connecting port for transmitting data.

The clock INTERNAL_CLOCK is generated from the reference clock of the local port (connected port).

The frequency ratio among the RX_CLOCK_DIVIDE_4, the RX_CLOCK_DIVIDE_10, and the INTERNAL_CLOCK is 5:2:2.

For example, when the serial bus transfer speed is 5.0 GT/s, RX_CLOCK_DIVIDE_4 equals 1.25 GHz, RX_CLOCK_DIVIDE_4 equals 0.5 GHz, and INTERNAL_CLOCK equals 0.5 GHz.

Up to the write to the gear-box 312, the operation is performed in synchronization with RX_CLOCK_DIVIDE_4.

The read from the gear-box 312, the operation of the 10-bit boundary detection circuit 313, and the write to the elastic buffer are performed in synchronization with RX_CLOCK_DIVIDE_10.

The read from the elastic buffer, the operations of the pattern detection circuit 315, the multilane control circuit 303, and the 8B10B conversion circuit 316 are performed in synchronization with INTERNAL_CLOCK.

When the DESerializer 311 outputs parallel data other than 4-bit width data, for example, when it outputs 8-bit and 16-bit width data, the DESerializer 311 outputs reception clock of ⅛ and 1/16 of the serial bus transfer speed, and writes the data to the gear-box 312.

The gear-box 312 is a FIFO unit, writes 4-bit width DATA_4BIT 321 according to the RX_CLOCK_DIVIDE_4 clock, and reads 10-bit width DATA_10BIT_UNALIGNMENT 322 according to THE RX_CLOCK_DIVIDE_10 clock. The gear-box 312 outputs the DATA_10BIT_UNALIGNMENT 322 to the 10-bit boundary detection circuit 313.

The 10-bit boundary detection circuit 313 detects a boundary pattern, and adjusts the DATA_10BIT_UNALIGNMENT 322 into 10-bit boundary data (DATA_10BIT_ALIGNMENT 323) in a 10b-code unit. The 10-bit boundary detection circuit 313 outputs the DATA_10BIT_ALIGNMENT 323 to the elastic buffer 314.

The elastic buffer 314 is a FIFO buffer and absorbs a clock frequency difference. The elastic buffer 314 normally increments by one a read address in every cycle, and holds, increments by one, or increments by 2 a read address according to a control signal from the pattern detection circuit 315.

The elastic buffer 314 reads data (DATA_10BIT 324) and outputs the data to the pattern detection circuit 315 and the 8B10B conversion circuit 316. It also outputs a signal indicating the collation between the difference between the write address and the read address and a predetermined value.

The pattern detection circuit 315 outputs a signal for control of a read address to the elastic buffer 314.

A serial data transfer is performed using 8B10B converted data. 8-bit width data (8b-code) is converted by a transmission circuit into 10-bit width data (10b-code), and the converted data is transmitted. A reception circuit restores the 10b-code to the 8b-code.

The 8B10B conversion circuit 316 converts the 10b-code data (DATA_10BIT 324) into the 8b-code (DATA_8BIT 325).

The serial bus protocol for converting data by conversion other than the 8B10B conversion, the 8B10B conversion circuit 316 is appropriately changed into a conversion circuit depending on the protocol. The 10-bit boundary detection circuit 313 is also appropriately changed depending on the protocol.

The multilane control circuit 303 is connected to the pattern detection circuit 315 of each lane block. The multilane control circuit 303 detects a skew between lanes, and outputs a deskew instruction (deskew_flag) to adjust the skew between lanes and a signal for adjustment of a read address to eliminate the skew between lanes to the pattern detection circuits 315 of all lane blocks.

Figure 1:
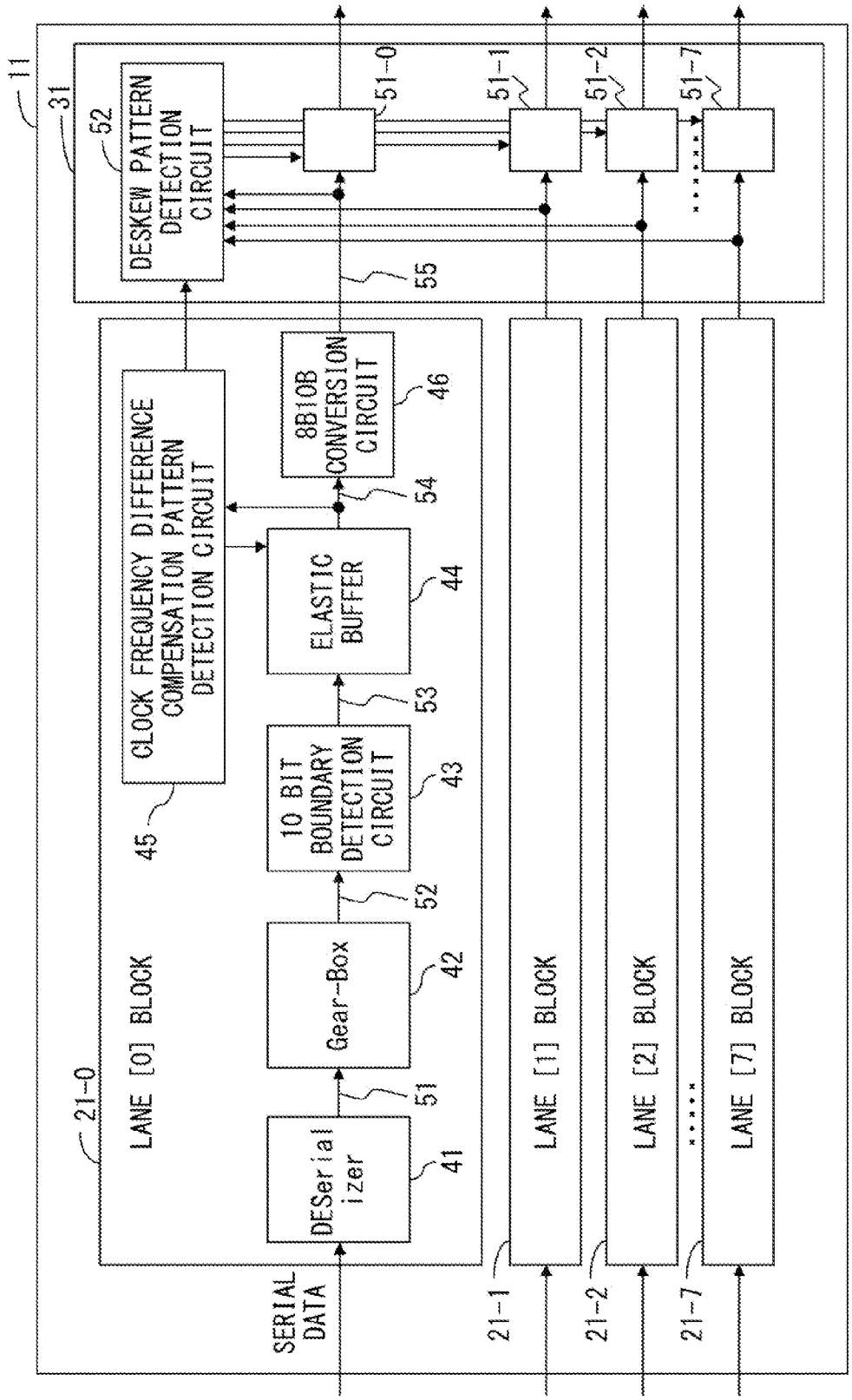
FIG. 1 is a configuration of a conventional reception circuit.

When the conventional reception circuit 11 illustrated in FIG. 1 is compared with the reception circuit 301 according to the embodiment of the present invention illustrated in FIG. 10, the deskew buffer 51 and the deskew pattern detection circuit 52 are deleted from the reception circuit 301 according to the embodiment of the present invention.

The function of adjusting the skew between lanes and the function of compensating for the clock frequency difference for each port, which have been performed by the deskew buffer 51 and the deskew pattern detection circuit 52 in the conventional reception circuit 11, are performed by the pattern detection circuit 315, the multilane control circuit 303, and the elastic buffer 314 in the embodiment of the present invention.

Described next is the operation of the reception circuit 301 during the initialization of the serial bus.

Figure 11:
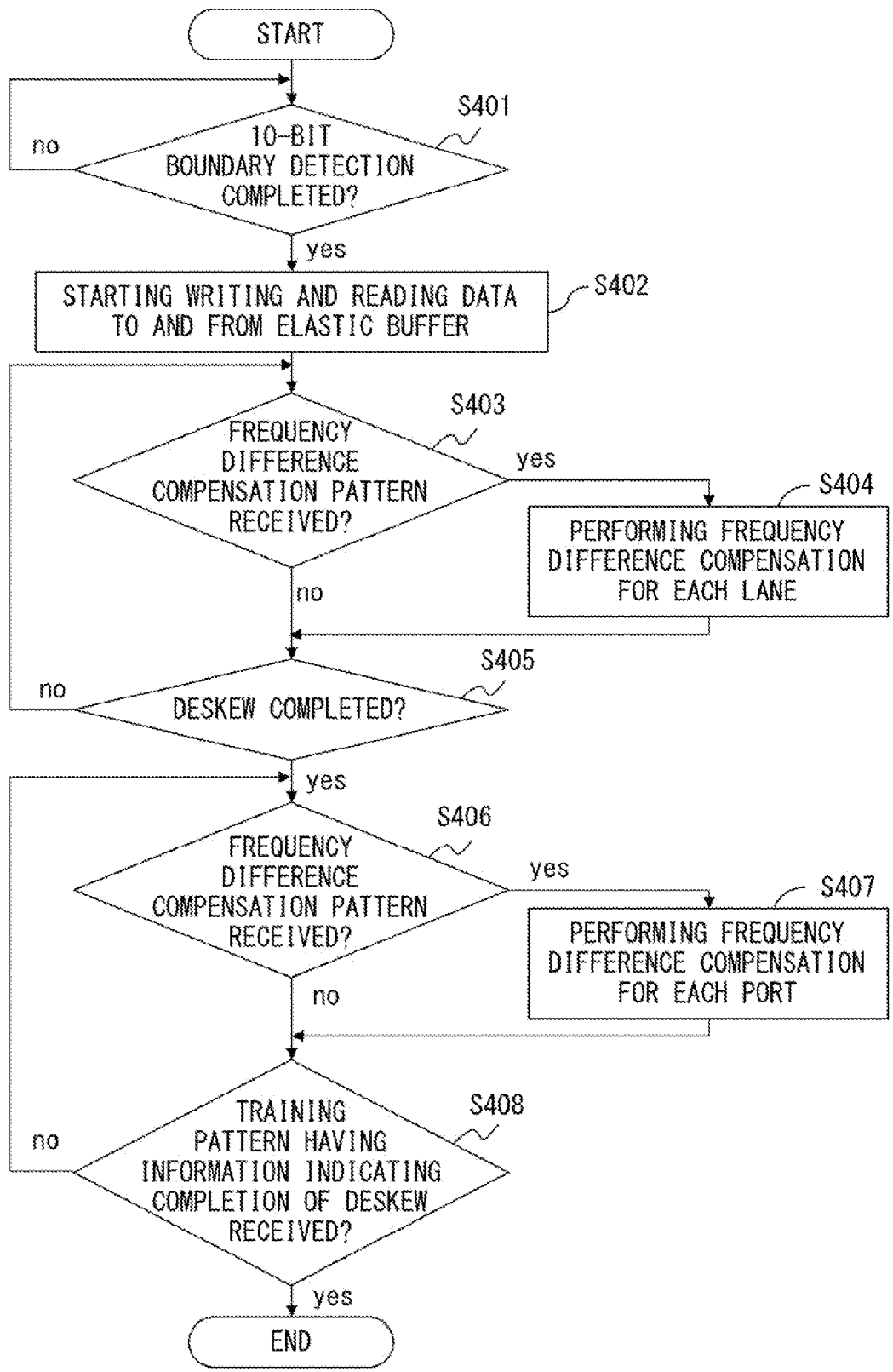
FIG. 11 is a flowchart of an operation during the initialization of the serial bus of a reception circuit.

FIG. 11 is a flowchart of an operation during the initialization of the serial bus of the reception circuit 301.

In step S401, when the reception circuit 301 detects a 10-bit boundary pattern according to the training pattern received by the 10 bit boundary detection circuit, control is passed to step S402. When the 10-bit boundary pattern is not detected, the information about the non-detection of the 10-bit boundary pattern is transmitted, and control is returned to the start.

In step S402, the reception circuit 301 starts writing data to the elastic buffer 314 and reading data from the elastic buffer 314 according to the 10-bit symbol boundary after detecting the 10-bit boundary pattern.

In step S403, when the reception circuit 301 receives a clock frequency difference compensation pattern, control is passed to step S404. When it does not receive the pattern, control is passed to step S405.

In step S404, the elastic buffer of each lane of the reception circuit 301 independently adjusts the read address of the elastic buffer 314 so that the difference between the write address and the read address (write-read address difference) of the elastic buffer 314 can be a reference value, and performs the clock frequency difference compensation. The reception circuit 301 detects a deskew pattern at a deskew instruction, and adjusts the skew between lanes.

In step S405, when the deskew is completed, control is passed to step S406, and if the deskew has not been completed, control is returned to step S403.

In step S406, when the reception circuit 301 receives a clock frequency difference compensation pattern, control is passed to step S407, and if the pattern has not been received, control is passed to step S408.

In step S407, the reception circuit 301 performs the clock frequency difference compensation on the entire lanes, that is, for each port.

In step S408, when the reception circuit 301 receives a training pattern having the information about the completion of the deskew, the process terminates. If it has not received the pattern, control is returned to step S406.

After the completion of the initialization of the serial bus, the transmission circuit 202 stops transmitting the training pattern, and starts transmitting data. After the completion of the initialization, the transmission circuit 202 periodically continues the transmission of the clock frequency difference compensation pattern.

The reception circuit 301 restores the received data. In this case, the reception circuit 301 continues the clock frequency difference compensation for each port.

The training pattern transmitted at the initialization has the information about the initialization state. Thus, a user can be informed of the state of the connected port, for example, that a 10-bit boundary pattern has been detected, that the deskew has been completed, etc., thereby synchronously completing the initializing process. For example, the reception circuit 301 recognizes from the training pattern received from the connecting port 201 and the training pattern transmitted from the local port (connected port) 211 that these ports have entered the state in which the deskew can be performed, and issues a deskew instruction.

Described next is the operation of the transmission circuit 202 at the initialization of the serial bus.

FIG. 12 is a flowchart of an operation during the initialization of the serial bus of the transmission circuit 202.

The training pattern and the frequency difference compensation pattern are transmitted with the same timing in all lanes of a transmission circuit.

In step S411, the transmission circuit 202 transmits a training pattern having the information indicating no detection of a 10-bit boundary pattern.

In step S412, the transmission circuit 202 determines whether or not 1666 cycles have passed after the previous transmission of the frequency difference compensation pattern. If 1666 cycles have passed, control is passed to step S413. If 1666 cycles have not passed yet, control is passed to step S414.

In step S413, the transmission circuit 202 transmits a frequency difference compensation pattern.

If the reception circuit 203 detects a 10-bit boundary pattern in step S414, control is passed to step S415. If the pattern has not been detected, control is returned to step S411.

In step S415, the transmission circuit 202 transmits a training pattern having the information about the deskew enabled state.

In step S416, the transmission circuit 202 determines whether or not 1666 cycles have passed after the previous transmission of the frequency difference compensation pattern. If 1666 cycles have passed, control is passed to step S417. If 1666 cycles have not passed yet, control is passed to step S418.

In step S417, the transmission circuit 202 transmits a frequency difference compensation pattern.

In step S418, when the reception circuit 203 completes the deskew, control is passed to step S419, and if it has not completed the deskew, control is returned to step S415.

In step S419, the transmission circuit 202 transmits a training pattern having the information about the deskew completed state.

In step S420, the transmission circuit 202 determines whether or not 1666 cycles have passed after the previous transmission of the frequency difference compensation pattern. If 1666 cycles have passed, control is passed to step S421. If 1666 cycles have not passed yet, control is passed to step S422.

In step S421, the transmission circuit 202 transmits a frequency difference compensation pattern.

In step S422, when the reception circuit 203 receives a training pattern having the information indicating the deskew completed state, control is passed to step S423. If the information has not been received, control is returned to step S419.

In step S423, the transmission circuit 202 transmits 16 training patterns having the information about the deskew completed state.

The operation performed during the initialization of the serial bus is not limited to the operations illustrated in FIGS. 11 and 12, but can be appropriately changed depending on the serial bus protocol.

Figure 13:
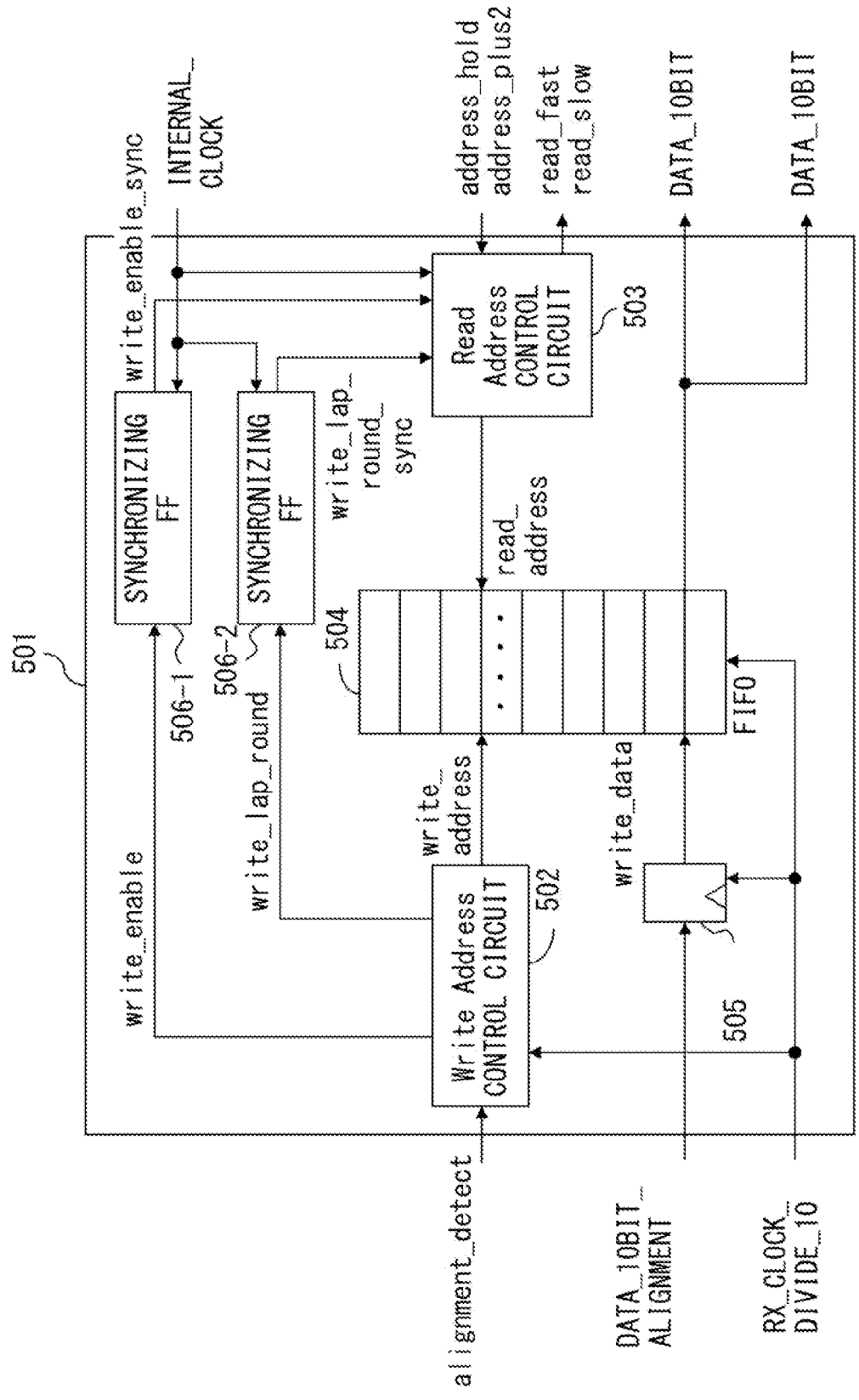
FIG. 13 is a configuration of the elastic buffer according to an embodiment of the present invention.

FIG. 13 is a configuration of the elastic buffer according to an embodiment of the present invention.

An elastic buffer 501 includes a write address control circuit 502, a read address control circuit 503, a FIFO 504, an FF 505, and synchronizing FFs 506-1 and 506-2.

The elastic buffer 501 corresponds to the elastic buffer 314 in FIG. 10.

The clock RX_CLOCK_DIVIDE_10 is input to the write address control circuit 502, the FIFO 504, and the FF 505. The write address control circuit 502, the FIFO 504, and the FF 505 operates in synchronization with the RX_CLOCK_DIVIDE_10. As described above, the RX_CLOCK_DIVIDE_10 is generated from received serial data by a clock recovery in the DESerializer 311.

The clock INTERNAL_CLOCK is input to the synchronizing FFs 506-1 and 506-2 and the read address control circuit 503. The synchronizing FFs 506-1 and 506-2 and the read address control circuit 503 operate in synchronization with the INTERNAL_CLOCK.

The FIFO 504 has twenty two stages with 10-bit width. Since there is a difference between a write clock and a read clock, there is a slight difference in throughput between a write and a read. In an embodiment of the present invention, the number of stages of the FIFO is 22, but the number is not limited to 22. When the skew between lanes of a system bus is small, the number of stages of a FIFO can be smaller.

The data write_data is written to the FIFO 504 at the write address write_address input from the write address control circuit 502.

The FF 505 outputs the DATA_10BIT_ALIGNMENT 323 as write_data in synchronization with the RX_CLOCK_DIVIDE_10.

Upon receipt of the boundary detection notification (alignment_detect signal) from the 10 bit boundary detection circuit, the write address control circuit 502 starts writing data (write_data) to the FIFO 504 for each symbol.

The write address control circuit 502 writes data in synchronization with the RX_CLOCK_DIVIDE_10. That is, the RX_CLOCK_DIVIDE_10 is a write clock.

The write address control circuit 502 writes data at the address write_address of the FIFO 504 when a write_enable signal is 1. The write address control circuit 502 starts the write address (write_address) from 0, and constantly increments the address by 1. The write address control circuit 502 laps round the write address at 21, and returns to 0. When returning the write address to 0, the write address control circuit 502 inverts a write_lap_round signal for notification of the lap-round of the write address to the reading side.

The synchronizing FF 506-1 outputs the write_enable signal as a write_enable_sync signal in synchronization with the RX_CLOCK_DIVIDE_10.

The synchronizing FF 506-2 outputs the write_lap_round signal as a write_lap_round_sync signal in synchronization with the RX_CLOCK_DIVIDE_10.

The read address control circuit 503 starts reading data at the read address 0 by the assertion of the write_enable_sync signal as a synchronized write_enable signal. The write address control circuit 502 basically increments the read address by one every cycle, laps round the read address at 21, and returns the read address to 0.

The read address control circuit 503 reads data in synchronization with INTERNAL_CLOCK. That is, the INTERNAL_CLOCK is a read clock. The read DATA_10BIT 324 is output to the pattern detection circuit 315 and the 8B10B conversion circuit 316.

The read address control circuit 503 realizes that the write address returns to 0 by detecting a change (inversion) of the write_lap_round_sync signal as the write_lap_round signal synchronized with the INTERNAL_CLOCK. Thus, the write-read address difference as a difference between a write address and a read address is realized. The write-read address difference changes depending on the clock frequency difference.

When a write clock is compared with a read clock, and the write clock is faster (the read clock is slower), the write-read address difference gradually becomes larger than a reference value.

When the write clock is slower (the read clock is faster), the write-read address difference gradually becomes smaller than the reference value.

When the write-read address difference is larger than the reference value, the read address control circuit 503 asserts a read_slow signal indicating that the read clock is slower.

When the write-read address difference is smaller than the reference value, the read address control circuit 503 asserts a read_fast signal indicating that the read clock is faster.

When the write-read address difference equals the reference value, the read_slow signal and the read_fast signal are not asserted. The read_slow signal and the read_fast signal are output to the pattern detection circuit 315.

The read address control circuit 503 adjusts the write-read address difference into the reference value by the function of clock frequency difference compensation.

The reference value is controlled by an address_hold signal and an address_plus2 signal. The address_hold signal and the address_plus2 signal are input from the pattern detection circuit 315.

When the address_hold signal is 1, the read address control circuit 503 adds the "DM" of the clock frequency difference compensation pattern by not increasing the read address.

When the address_plus2 signal is 1, the read address control circuit 503 deletes the "DM" of the clock frequency difference compensation pattern by increasing by 2 the read address.

The information about the write-read address difference is updated by a change of the write_lap_round_sync signal or the assertion of the address_hold signal and the address_plus2 signal.

FIG. 14 is a configuration of the pattern detection circuit according to an embodiment of the present invention.

A pattern detection circuit 601 includes a deskew pattern comparison circuit 602, a clock frequency difference compensation pattern head comparison circuit 603, a counter 604, a lane read address control circuit 605, and a selector 606.

The pattern detection circuit 601 corresponds to the pattern detection circuit 315 in FIG. 10.

The clock INTERNAL_CLOCK is input to the counter 604 and the lane read address control circuit 605. The counter 604 and the lane read address control circuit 605 operate in synchronization with the INTERNAL_CLOCK.

The deskew pattern comparison circuit 602 asserts a deskew_pattern_detect signal when the "DS" included in the training pattern is detected. The deskew pattern comparison circuit 602 outputs the deskew_pattern_detect signal to the counter 604.

The clock frequency difference compensation pattern head comparison circuit 603 asserts a clock_pattern_detect signal when the "CH" included in the clock frequency difference compensation pattern is detected.

The clock frequency difference compensation pattern head comparison circuit 603 outputs the clock_pattern_detect signal to the lane read address control circuit 605 and the multilane control circuit 303.

The counter 604 counts the period in which the deskew_pattern_detect signal is asserted. That is, the counter counts the number of cycles from the detection of the "DS". The number is counted from 1 to 7, and the count value refers to the skew between lanes. For example, when the count value is 0, it refers to no detection of the "DS". When the count value is 1, it refers to one cycle after the detection of the "DS". The counter 604 outputs the count value as a deskew_pattern_cycle signal to the multilane control circuit 303.

The lane read address control circuit 605 controls an address_hold_lane signal and an address_plus2_lane signal depending on the values of the read_fast signal and the read_slow signal when the clock_pattern_detect signal is 1.

The read_fast signal and the read_slow signal are input from the read address control circuit 503 to the lane read address control circuit 605 and the multilane control circuit 303.

The lane read address control circuit 605 asserts the address_hold_lane signal when the clock_pattern_detect signal is 1 and the read_fast signal is 1.

The lane read address control circuit 605 asserts the address_plus2_lane signal when the clock_pattern_detect signal is 1 and the read_slow signal is 1.

The lane read address control circuit 605 does not assert the address_hold_lane signal and the address_plus2_lane signal when the read_fast signal is 0 and the read_slow signal is 0.

The selector 606 outputs the address_hold_lane signal as an address_hold signal and the address_plus2_lane signal as an address_plus2 signal when a deskew_flag signal from the multilane control circuit 303 is 0.

The selector 606 outputs an address_hold_port signal as an address_hold signal and an address_plus2_port signal as an address_plus2 signal when a deskew_flag signal from the multilane control circuit 303 is 1.

The selector 606 outputs the address_hold signal and the address_plus2 signal to the elastic buffer.

Figure 15:
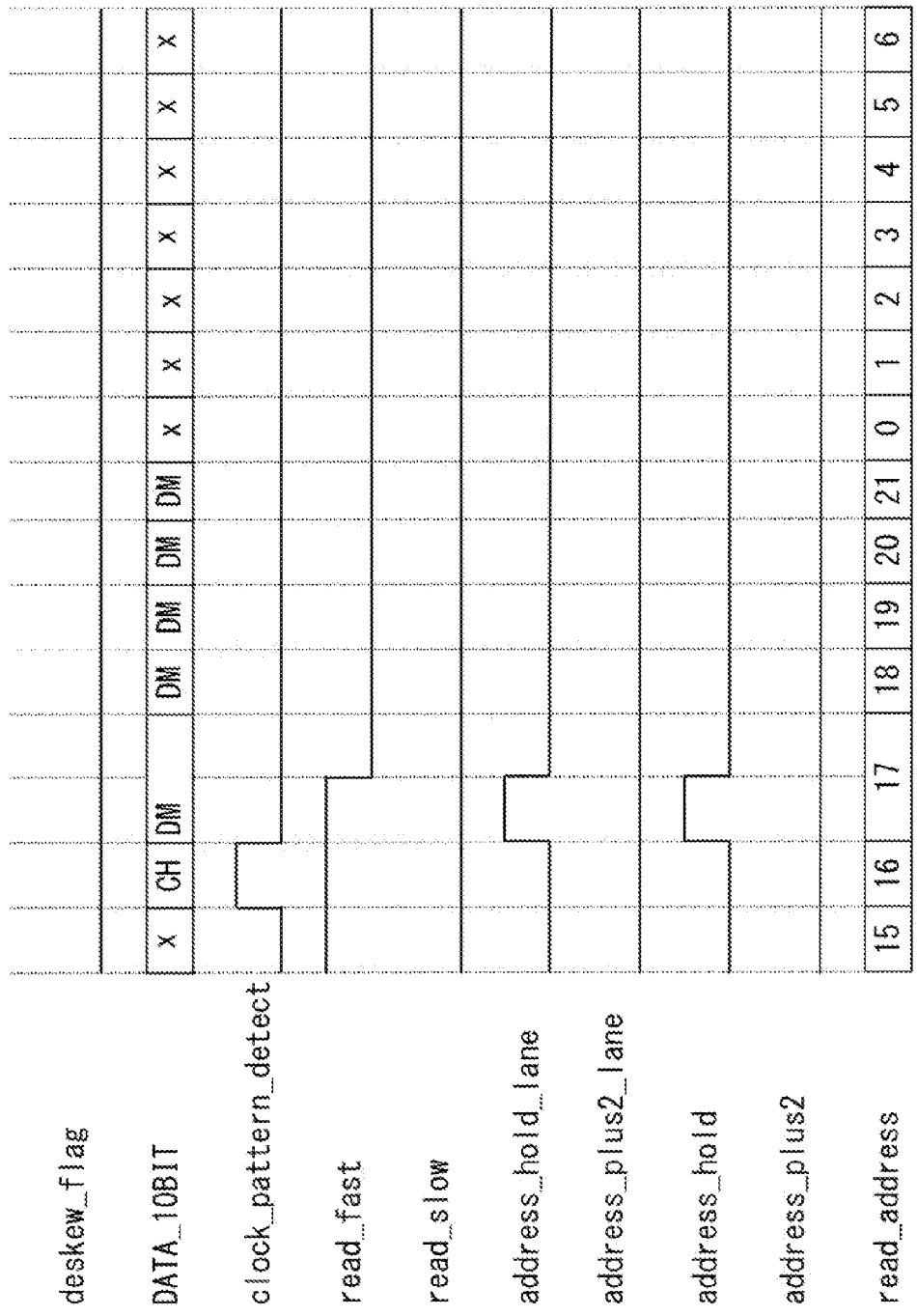
FIG. 15 is a clock frequency difference compensation time chart for each lane.

FIG. 15 is a clock frequency difference compensation time chart for each lane.

Before the deskew, the lane read address control circuit 605 of each lane performs the clock frequency difference compensation.

In FIG. 15, when the read address (read_address) is 16, the "CH" is detected, and the clock_pattern_detect signal is asserted. Since the clock_pattern_detect signal is 1 and the read_fast signal is 1, the address_hold_lane signal is asserted.

When the read address (read_address) is 17, the address_hold_lane signal is asserted. In this case, since the deskew_flag signal is 0, the address_hold_lane signal is output as an address_hold signal. Therefore, the address_hold signal is similarly asserted as with the address_hold_lane signal.

Since the address_hold signal is asserted, the read address is held for 2 cycles at read address 17.

FIG. 16 is a configuration of the multilane control circuit according to an embodiment of the present invention.

A multilane control circuit 701 includes a wiring delay countermeasure FF 702-*m*-*n* (m=0 through 7) and a port read address control circuit 703.

For discrimination of a signal name of each lane in the following descriptions and drawings, the signal of the lane m block (m=0 through 7) may be described and illustrated with "-m" at the tail of the signal name. For example, the deskew_pattern_cycle signal of the lane 0 block can be described as deskew_pattern_cycle_0.

The clock INTERNAL_CLOCK is input to the wiring delay countermeasure FF 702 and the port read address control circuit 703. The wiring delay countermeasure FF 702 and the port read address control circuit 703 operate in synchronization with the INTERNAL_CLOCK.

The wiring delay countermeasure FF 702 is a flip-flop as a countermeasure against a wiring delay. In the embodiment of the present invention, a signal input to the multilane control circuit 701 passes through the two wiring delay countermeasure FFs 702-*m*-0 and 702-*m*-1, and is input to the port read address control circuit 703. The signal output from the port read address control circuit 703 passes through the two wiring delay countermeasure FFs 702-*m*-3 and 702-*m*-4, and is output to the pattern detection circuit 315.

The port read address control circuit 703 performs deskew in the entire lanes but in each lane, that is, synchronously in the port and the clock frequency difference compensation after the completion of the deskew.

A deskew_pattern_cycle_m signal, a clock_pattern_detect_m signal, a read_fast_m signal, and a read_slow_m signal are input from the pattern detection circuit 315 of the lane m block to the port read address control circuit 703 through the wiring delay countermeasure FFs 702-*m*-1 and 702-*m*-2.

The port read address control circuit 703 outputs an address_hold_port_m signal, an address_plus2_port_m signal, and a deskew_flag_m signal to the pattern detection circuit 315 of the lane m block 302-*m* through the wiring delay countermeasure FFs 702-*m*-3 and 702-*m*-4.

The port read address control circuit 703 realizes that the "DS" bas been detected in all lane blocks 302 when all deskew_pattern_cycle signals notified from each lane block are any value other than 0. In this case, the port read address control circuit 703 asserts the deskew_flag signal of each lane block 302. When the deskew_flag signal is 1, it indicates the deskew completed or being processed.

The port read address control circuit 703 controls the address_hold_port signal and the address_plus2_port signal according to the read_fast signal and the read_slow signal when the clock_pattern_detect signal notified from each lane block 302 is 1.

When the clock_pattern_detect signal is 1, and when the read_fast signal of any lane block 302 is 1, the port read address control circuit 703 asserts the address_hold_port signals of all lane blocks 302.

When the clock_pattern_detect signal is 1, and when the read_slow signals of all lane blocks 302 are 1, the port read address control circuit 703 asserts the address_plus2_port signals of all lane blocks 302.

FIG. 17 illustrates the arrangement of the wiring of the reception circuit 301 according to an embodiment of the present invention.

In the embodiment of the present invention, it is assumed that the wiring distance between the lane block 302 and the multilane control circuit 303, especially between lane 0 block 302-0, the lane 7 block 302-7 and the multilane control circuit 303, is long. In this case, to satisfy the wiring delay, the number of stages of the wiring delay countermeasure FF 702 connected to each lane block 302 is 2 as illustrated in FIG. 16.

The two-stage wiring delay countermeasure FF 702 is an example only, and the configuration is not limited to this application. Depending on the arranged wiring and the operation frequency, the number of stages of the wiring delay countermeasure FF 702 and the length of the clock frequency difference compensation pattern can be appropriately set.

In the arranged wiring of the reception circuit in FIG. 17, the number of lanes is 8, and it is desired that a system bus has a large transfer band. For example, when the number of lanes is 16, the distance between the distant lane block 302 and the multilane control circuit 303 is long, and the wiring delay is large. In this case, depending on the operation frequency, the number of wiring delay countermeasure FFs 702 of the multilane control circuit illustrated in FIG. 16 is to be increased, and the length of the clock frequency difference compensation pattern in FIG. 9 is to be larger.

On the other hand, when the reception circuit according to the embodiment of the present invention is applied to a serial bus having a small transfer band, the number of wiring delay countermeasure FFs 702 can be decreased to reduce the length of the clock frequency difference compensation pattern depending on the small number of lanes, the low operation frequency, and other conditions.

In addition, when the reception circuit according to the embodiment of the present invention is applied to an existing serial bus protocol, the length of the clock frequency difference compensation pattern is already determined by the protocol. In this case, the number of stages of the wiring delay countermeasure FF 702 is determined to satisfy the length of the clock frequency difference compensation pattern of the serial bus protocol.

Described below is the deskew which is to be performed not in each lane but in the entire lanes, that is, synchronously in the port, and the clock frequency difference compensation after the completion of the deskew.

Figure 18:
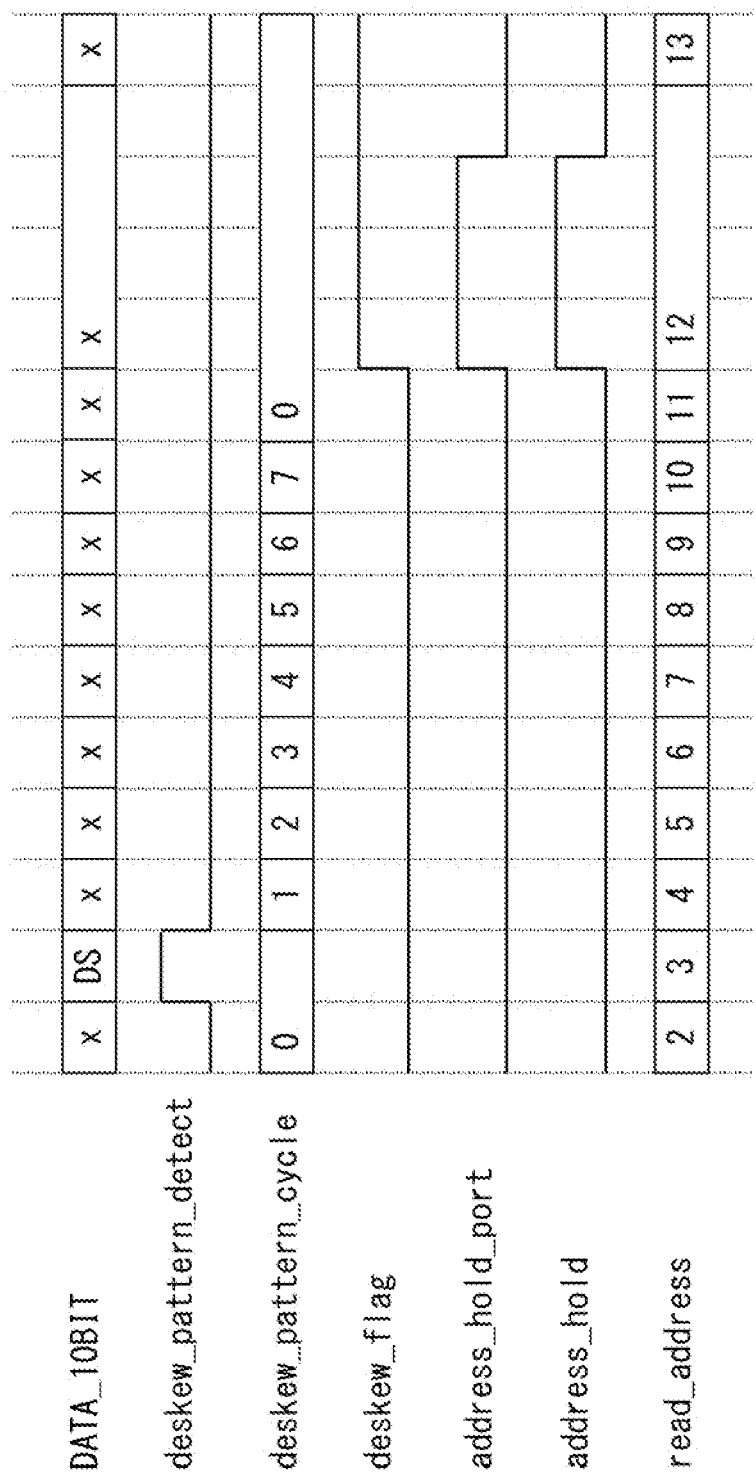
FIG. 18 is a timing chart of the lane block during the deskew.

FIG. 18 is a timing chart of each signal of the lane block during the deskew.

In FIG. 18, when the "DS" of the training pattern is detected, the deskew_pattern_detect signal is asserted.

When the deskew_pattern_detect signal is asserted, the counting operation on the deskew_pattern_cycle signal is started.

When the deskew_flag signal and the address_hold_port signal are asserted, the selector 606 outputs the address_hold_port signal as an address_hold signal. Therefore, the address_hold signal is synchronized with the address_hold_port signal.

When the address_hold signal is asserted, the read address (read_address) is held. Therefore, in FIG. 18, the read_address is held for 4 cycles at the address 12.

Figure 19:
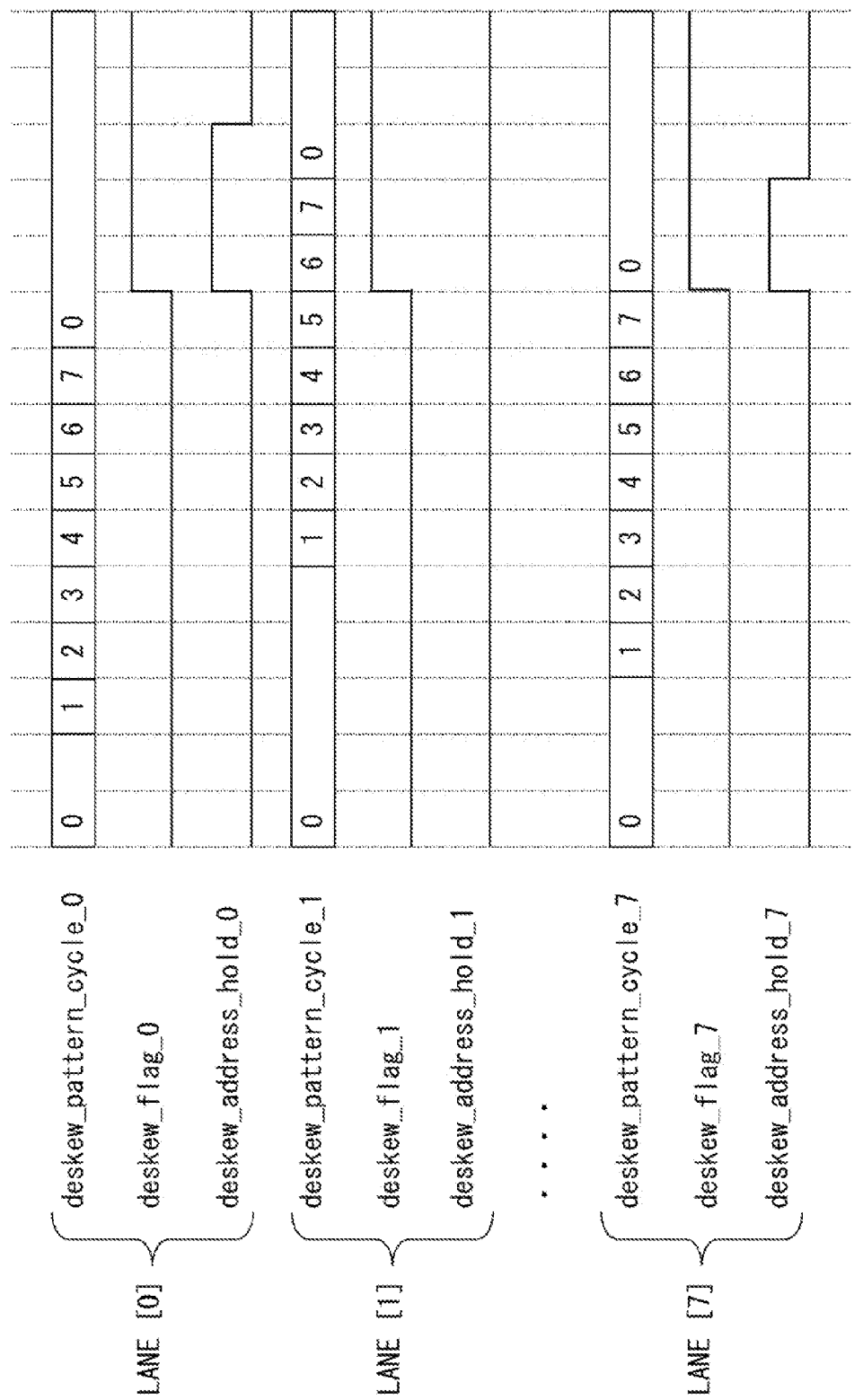
FIG. 19 is a timing chart of the multilane control circuit during the deskew.

FIG. 19 is a timing chart of each signal of the multilane control circuit during the deskew.

FIG. 19 is the timing chart of the deskew_pattern_cycle signal, the deskew_flag signal, and a deskew_address_hold signal of blocks in lanes 0, 1 and 7, and the signals in lanes 2 through 6 are omitted.

The port read address control circuit 703 realizes that the "DS" bas been detected in all lane blocks 302 when all deskew_pattern_cycle signals notified from each lane block are any value other than 0. In this case, the port read address control circuit 703 asserts the deskew_flag signal of each lane block. When the deskew_flag signal is 1, it indicates the deskew completed or being processed.

In FIG. 19, the "DS" is last detected in the lane 1 block. Therefore, the deskew_pattern_cycle_1 signal indicates 1 last among the deskew_pattern_cycle signals of other lane blocks.

Simultaneously when the deskew_flag signals of all lane blocks are asserted, the port read address control circuit 703 asserts the address_hold_port signal of each lane block in the cycle corresponding to the value of the deskew_pattern_cycle signal of each lane block when the deskew_pattern_cycle signals of all lane blocks indicate any values other than 0.

In FIG. 19, when the deskew_pattern_cycle_1 signal of the lane 1 block in which the "DS" is last detected indicates 1, the value of the deskew_pattern_cycle_0 signal of the lane 0 block is 4. That is, there is a difference of 3 cycles between when the deskew_pattern_cycle_0 signal indicates 1 and when the deskew_pattern_cycle_1 signal indicates 1.

Therefore, the deskew_address_hold_0 signal of the lane 0 block is asserted for 3 cycles.

Similarly the deskew_address_hold_7 signal of the lane 7 block is asserted for 2 cycles.

The value corresponding to the deskew_pattern_cycle signal refers to the skew between lanes.

The port read address control circuit 703 does not assert the address_hold_port signal of the lane block in which the "DS" is last detected.

In FIG. 19, the address_hold_port_1 signal of the lane 1 block in which the "DS" is last detected is not asserted.

The read address control circuit 503 of the elastic buffer 501 does not increment the read address while the address_hold_port signal is asserted. That is, the write-read address difference of the elastic buffer of the lane in which the "DS" is last detected is close to the reference value. The write-read address differences of other lanes are larger than the reference value.

The timing charts of FIGS. 18 and 19 illustrate the signals before input to the multilane control circuit and after output from the multilane control circuit as illustrated in FIG. 16. That is, the input signal (for example, the deskew_pattern_cycle signal) is a signal before passing through the wiring delay countermeasure FF, and the output signal (for example, the deskew_flag signal) is a signal after passing through the wiring delay countermeasure FF.

Therefore, for example, as described above, the port read address control circuit 703 asserts the deskew_flag signal of each lane block when all deskew_pattern_cycle signals indicate any values other than 0. However, since the timing charts in FIGS. 18 and 19 illustrate the signals before or after passing through the wiring delay countermeasure FF, the timing with which the deskew_flag signal is 1 is indicated some cycles behind the timing with which the deskew_flag signal is asserted. The same holds true with FIGS. 20 and 21 described later.

Described next is the clock frequency difference compensation for each port.

Since the number of LSI units is small in a small server, it is easy to provide the same reference clock for all LSI units having a system bus. Therefore, a system bus of a small server does not require a clock frequency difference compensating function.

However, in a system bus of a large server, when the same reference clock is distributed to a large number of LSI units, the wiring distance is long or the number of stages of the repeaters is large for distribution, thereby generating large jitter etc. and failing in distributing the same reference clock. Accordingly, different reference clocks are used among connection devices, and the clock frequency difference compensating function is required.

Figure 20:
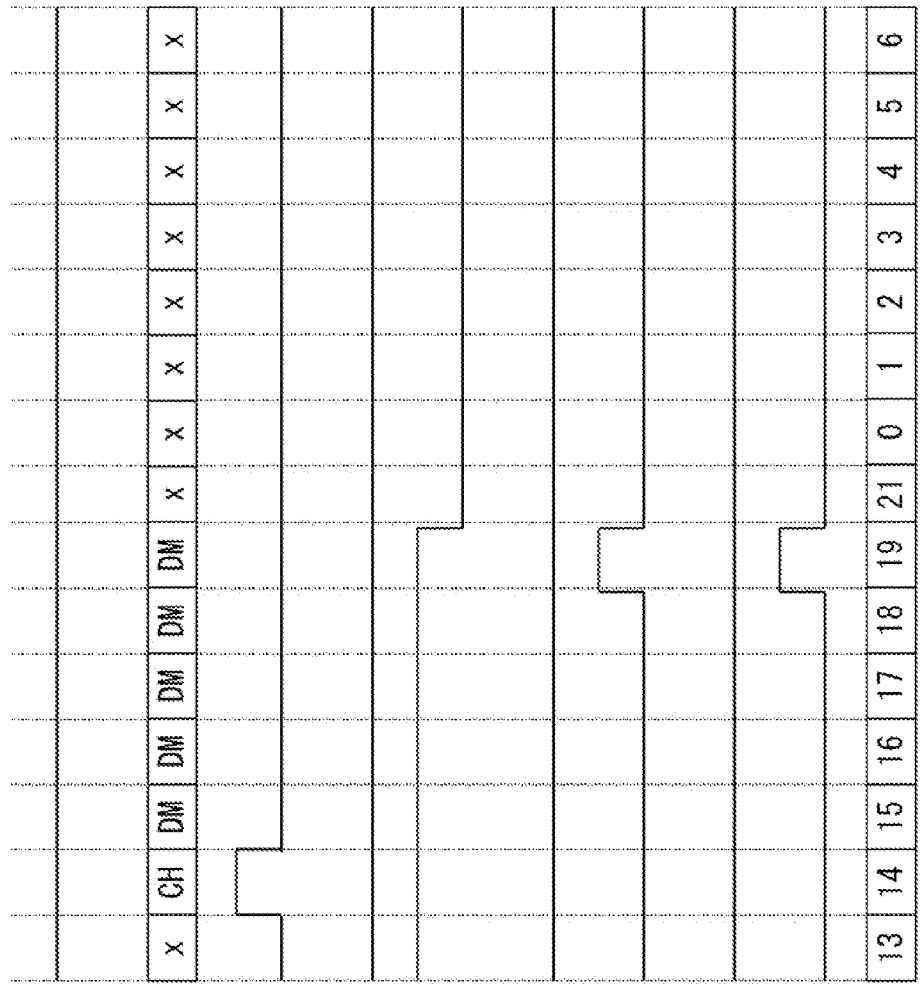
FIG. 20 is a timing chart of the lane block of the clock frequency difference compensation after the completion of the deskew.

FIG. 20 is a timing chart of the clock frequency difference compensation of the lane block after the completion of the deskew.

In FIG. 20, when the "CH" of the clock frequency difference compensation pattern is detected, the clock_pattern_detect signal is asserted.

Since the deskew_flag signal is asserted, the address_hold signal and the address_plus2 signal is synchronized respectively with the address_hold_port signal and the address_plus2_port signal.

Therefore, when the address_plus2_port signal is asserted, the address_plus2 signal is also asserted. When the read address (read_address) is 19, the address_plus2 signal is asserted. Therefore, the read address is incremented by 2, and indicates 21.

Figure 21:
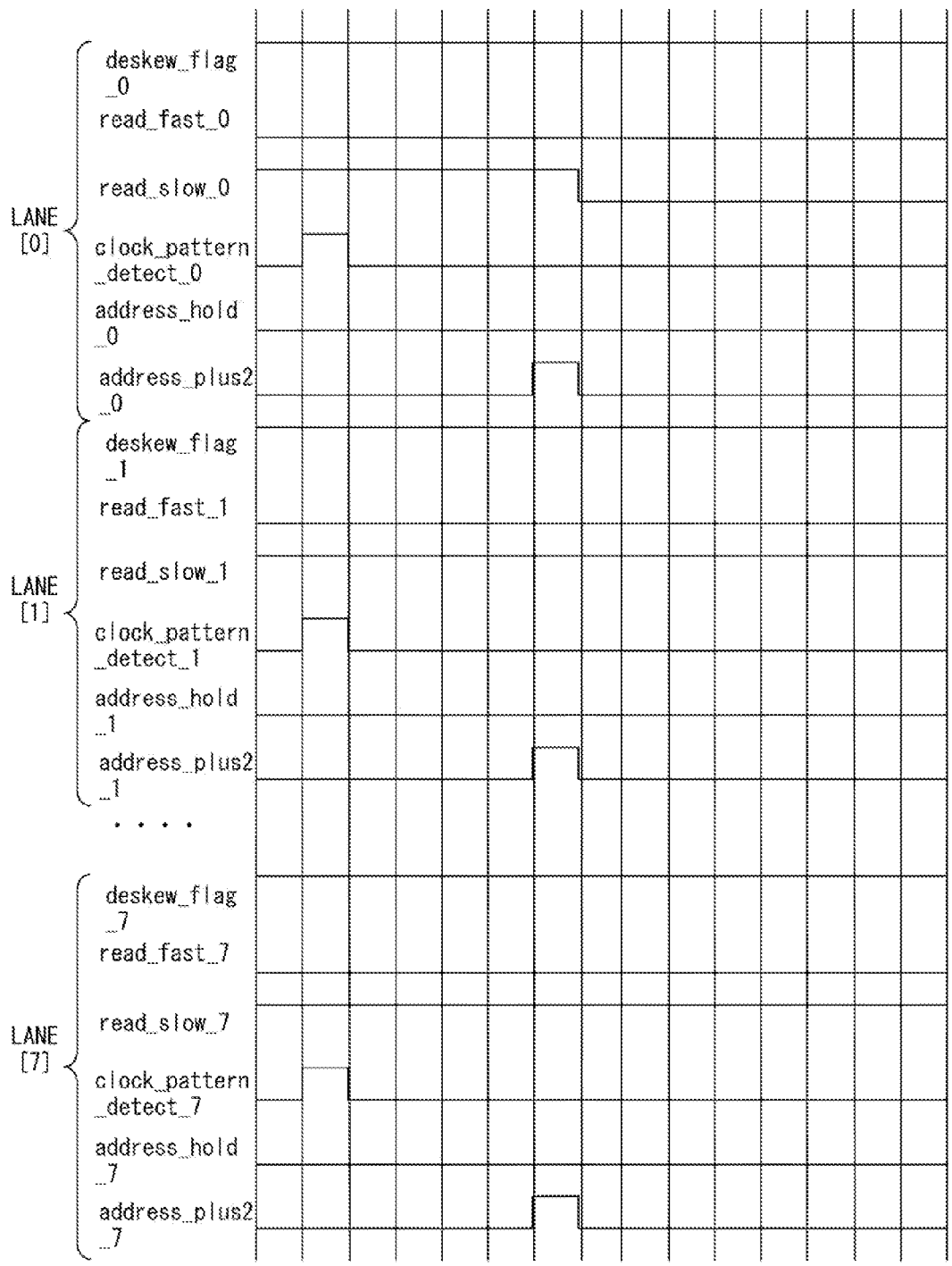
FIG. 21 is a timing chart of the multilane control circuit of the clock frequency difference compensation after the completion of the deskew.

FIG. 21 is a timing chart of the clock frequency difference compensation of the multilane control circuit after the completion of the deskew.

FIG. 21 is a timing chart of the deskew_flag signal, the read_fast signal, the read_slow signal, the clock_pattern_detect signal, the address_hold signal, and the address_plus2 signal of the lane 0 block, the lane 1 block, and the lane 7 block, and the signal of the lane 2 block through the lane 6 block are omitted.

The port read address control circuit 703 controls the address_hold_port signal and the address_plus2_port signal according to the read_fast signal and the read_slow signal when the clock_pattern_detect signal notified from the lane block is 1.

When the clock_pattern_detect signal is 1, and when the read_fast signal of any lane block is 1, the port read address control circuit 703 asserts the address_hold_port signals of all lane blocks.

When the clock_pattern_detect signal is 1, and when the read_slow signals of all lane blocks are 1, the port read address control circuit 703 asserts the address_plus2_port signals of all lane blocks.

In FIG. 21, the position of the skew between lanes is aligned after the completion of the deskew. Therefore, the clock_pattern_detect signal of each lane block is simultaneously asserted.

When the clock_pattern_detect signal is asserted, the read_slow signals of all lane blocks are asserted. Therefore, the address_plus2_port signal of each lane block is asserted.

Since the deskew_flag signal of each lane block is asserted, the address_hold signal and the address_plus2 signal of each lane block are synchronized respectively with the address_hold_port signal and the address_plus2_port signal.

Therefore, when the address_plus2_port signal of each lane block is asserted as described above, the address_plus2 signal of each lane block is also asserted.

The timing charts in FIGS. 20 and 21 illustrate the signals before input to the multilane control circuit and after output from the multilane control circuit as illustrated in FIG. 16. That is, the input signal (for example, the deskew_pattern_detect signal) is a signal before passing through the wiring delay countermeasure FF, and the output signal (for example, the address_plus2_port signal) is a signal after passing through the wiring delay countermeasure FF.

Therefore, for example, when the clock_pattern_detect signal is 1 as described above, and when the read_slow signals of all lane blocks are 1, the port read address control circuit 703 asserts the address_plus2_port signals of all lane blocks, but the timing charts in FIGS. 20 and 21 illustrate the signals before or after passing the wiring delay countermeasure FF. Therefore, the timing with which the address_plus2 signal is 1 is indicated with delay.

According to the reception circuit of the embodiment of the present invention, the deskew buffer used in the conventional reception circuit is reduced, thereby minimizing the latency of the circuit. In addition, according to the reception circuit of the embodiment of the present invention, the clock frequency difference compensation can be performed for each port.

When the above-mentioned reception circuit is applied to a reception circuit of all LSI units having a system bus I/F loaded into a server, the latency reducing effect is a multiple of the number of LSI units which are passed through during the transmission of a packet. Specifically, in a large server, the latency reducing effect is enhanced because of a large number of LSI units which are passed through during the transmission of a packet.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. A reception circuit that receives data in serial communications through a plurality of lanes, comprising:
a plurality of buffers that each stores data received through corresponding lane, one buffer of the plurality of buffers provided for each of the plurality of lanes;
a multilane control circuit that detects the skew between the lanes by detecting a deskew pattern at each buffer's read data of the plurality of lanes, that outputs, according to the detected skew, a first signal, which does not increment a read address of each of the plurality of buffers and which is for eliminating the skew between the lanes, to a plurality of address control circuits other than an address control circuit corresponding to a lane that is a last to receive the deskew pattern, and that outputs a deskew information indicating that a skew adjustment between which buffer the lanes is to be performed;
the plurality of address control circuits that each transmits the first signal to a corresponding buffer when receiving the deskew information, one address control circuit of the plurality of address control circuits provided for each of the plurality of lanes;
a plurality of address controllers that each starts writing and reading to the corresponding buffer by detecting a boundary, and constantly increments a write address by one after starting the writing; and
a plurality of flip-flops that are provided between each of the plurality of address control circuits and the multilane control circuit,
wherein each of the plurality of buffers that have received the first signal adjusting its read address,
the plurality of buffers each outputs a difference information indicating whether a difference between a write address and a read address is larger or smaller than a predetermined value,
the multilane control circuit outputs the first signal that does not increment the read address and a second signal, which increments the read address by two, to all the plurality of address control circuits, according to a plurality of difference information at predetermined timing after adjusting skew between lanes,
the plurality of address control circuits each output the first signal and the second signal to the corresponding buffer corresponding the lane of which skew is adjusted by the multilane control circuit, and
the predetermined timing is any timing between detection of one symbol subsequent to a head symbol in a clock frequency difference compensation pattern and detection of one symbol prior to an end symbol in the clock frequency difference compensation pattern in each read data read from each of the plurality of buffers, the predetermined timing depending on a number of the plurality of flip-flops.

2. The circuit according to claim 1, wherein
when a difference information of any of the plurality of lanes indicates that a difference between a write address and a read address is smaller than the predetermined value, the multilane control circuit instructs no increment of the read address by the first signal, and when difference information of all of the plurality of lanes indicate that the differences are larger than the predetermined value, the multilane control circuit instructs to increment by two to the read address by the second signal.

3. An information processing device including a reception circuit that receives data in serial communications through a plurality of lanes, wherein
the reception circuit comprises:
a plurality of buffers that each stores data received through corresponding lane, one buffer of the plurality of buffers provided for each of the plurality of lanes;
a multilane control circuit that detects the skew between the lanes by detecting a deskew pattern at each buffer's read data of the plurality of lanes, that outputs, according to the detected skew, a first signal, which does not increment a read address of each of the plurality of buffers and which is for eliminating the skew between the lanes, to a plurality of address control circuits other than an address control circuit corresponding to a lane that is a last to receive the deskew pattern, and that outputs a deskew information indicating that a skew adjustment between which buffer the lanes is to be performed;
the plurality of address control circuits that each transmits the first signal to a corresponding buffer when receiving the deskew information, one address control circuit of the plurality of address control circuits provided for each of the plurality of lanes;
a plurality of address controllers that each starts writing and reading to the corresponding buffer by detecting a boundary, and constantly increments a write address by one after starting the writing; and
a plurality of flip-flops that are provided between each of the plurality of address control circuits and the multilane control circuit,
wherein each of the plurality of buffers that have received the first signal adjusting its read address,
the plurality of buffers each outputs a difference information indicating whether a difference between a write address and a read address is larger or smaller than a predetermined value,
the multilane control circuit outputs the first signal that does not increment the read address and a second signal, which increments the read address by two, to all the plurality of address control circuits, according to a plurality of difference information at predetermined timing after adjusting skew between lanes,
the plurality of address control circuits each output the first signal and the second signal to the corresponding buffer corresponding the lane of which skew is adjusted by the multilane control circuit, and
the predetermined timing is any timing between detection of one symbol subsequent to a head symbol in a clock frequency difference compensation pattern and detection of one symbol prior to an end symbol in the clock frequency difference compensation pattern in each read data read from each of the plurality of buffers, the predetermined timing depending on a number of flip-flops.

4. The device according to claim 3, wherein
when a difference information of any of the plurality of lanes indicates that a difference between a write address and a read address is smaller than the predetermined value, the multilane control circuit instructs no increment of the read address by the first signal, and when difference information of all of the plurality of lanes indicate that the differences are larger than the predetermined value, the multilane control circuit instructs to increment by two to the read address by the second signal.

5. A buffer controlling method for a reception that receives data in serial communications through a plurality of lanes, including a plurality of buffers that each stores data received through corresponding lane, the method comprising:
starting writing and reading to a corresponding buffer by detecting a boundary;
constantly incrementing a write address by one after starting the writing;
detecting the skew between the lanes by detecting a deskew pattern of each read data read from each of the plurality of buffers;
outputting, according to the detected skew, a first signal, which does not increment a read address of each of the plurality of buffers and which is for eliminating the skew between the lanes, to a plurality of address control circuits other than an address control circuit corresponding to a lane that is a last to receive the deskew pattern, and outputting a deskew information indicating that a skew adjustment between which buffer the lanes is to be performed;
transmitting the first signal to the corresponding buffer when receiving the deskew information by the plurality of address control circuits;
outputting a difference information indicating whether a difference between a write address and a read address of each of the plurality of buffers for the corresponding lane is larger or smaller than a predetermined value;
outputting the first signal that does not increment the read address and a second signal, which increments the read address by two, to all the plurality of address control circuits, according to a plurality of difference information at predetermined timing after adjusting skew between lanes; and
transmitting the first signal and the second signal to the corresponding buffer corresponding the lane of which skew is adjusted by a multilane control circuit by the plurality of address control circuits each of which is provided for each of the plurality of lanes,
wherein each of the plurality of buffers that have received the first signal adjusting its read address,
one buffer of the plurality of buffers provided for each of the plurality of lanes, and
one address control circuit of the plurality of address control circuits provided for each of the plurality of lanes,
a plurality of flip-flops that are provided between each of the plurality of address control circuits and the multilane control circuit, and
the predetermined timing is any timing between detection of one symbol subsequent to a head symbol in a clock frequency difference compensation pattern and detection of one symbol prior to an end symbol in the clock frequency difference compensation pattern in each read data read from each of the plurality of buffers, the predetermined timing depending on a number of the plurality of flip-flops.

* * * * *